United States Patent
Park

(10) Patent No.: US 11,314,976 B2
(45) Date of Patent: Apr. 26, 2022

(54) VEHICLE CONTROL DEVICE

(71) Applicant: LG Electronics Inc., Seoul (KR)

(72) Inventor: Minsick Park, Seoul (KR)

(73) Assignee: LG Electronics Inc., Seoul (KR)

( * ) Notice: Subject to any disclaimer, the term of this patent is extended or adjusted under 35 U.S.C. 154(b) by 66 days.

(21) Appl. No.: 16/486,074

(22) PCT Filed: Mar. 15, 2019

(86) PCT No.: PCT/KR2019/003072
§ 371 (c)(1),
(2) Date: Aug. 14, 2019

(87) PCT Pub. No.: WO2020/189807
PCT Pub. Date: Sep. 24, 2020

(65) Prior Publication Data
US 2021/0334562 A1    Oct. 28, 2021

(51) Int. Cl.
*G06K 9/00* (2006.01)
*G10L 15/22* (2006.01)

(52) U.S. Cl.
CPC ..... *G06K 9/00838* (2013.01); *G06K 9/00335* (2013.01); *G06K 9/00845* (2013.01); *G10L 15/22* (2013.01); *G10L 2015/223* (2013.01)

(58) Field of Classification Search
CPC .......... G06K 9/00838; G06K 9/00845; G06K 9/00335; G10L 15/22; G10L 2015/223; B60K 37/06; B60K 2370/11; B60K 2370/146; B60K 2370/148; B60K 2370/21; B60R 16/037; B60R 21/015;
(Continued)

(56) References Cited

U.S. PATENT DOCUMENTS

2014/0181759 A1    6/2014  Kim
2017/0313248 A1*  11/2017  Kothari ................. H04N 5/247
2018/0150141 A1    5/2018  Sprickmann Kerkerinck et al.

FOREIGN PATENT DOCUMENTS

JP    2014048680    3/2014
JP    2016053880    4/2016
(Continued)

OTHER PUBLICATIONS

Korean Office Action in Korean Appln. No. 10-2019-7019304, dated Aug. 24, 2020, 14 pages (with English translation).
(Continued)

*Primary Examiner* — Charlotte M Baker
(74) *Attorney, Agent, or Firm* — Fish & Richardson P.C.

(57) ABSTRACT

A vehicle control device is disclosed. The vehicle control device includes: an interface unit that is connected to a camera for capturing a vehicle passenger and to a plurality of devices installed inside the vehicle; and a processor that receives an image captured by the camera through the interface unit and exchanges information with the plurality of devices through the interface unit, wherein the processor detects the position of the passenger from the image acquired by the camera, configures a space adjacent to the passenger as a virtual control space, matches a device corresponding to the position of the passenger, among the plurality of devices, to the virtual control device, and, upon detecting a preset gesture through the virtual control space, controls the device based on the preset gesture.

19 Claims, 20 Drawing Sheets

(58) Field of Classification Search
CPC . B60R 21/01538; B60W 30/14; B60W 40/08;
B60W 50/00; B60W 50/08; B60W
60/001; B60W 2040/0881; B60W
2040/089; B60W 2050/009; B60W
2420/42; B60W 2540/21; G06F 3/01;
G06F 3/167; G06F 3/017
USPC ........................................................ 382/104
See application file for complete search history.

(56) References Cited

FOREIGN PATENT DOCUMENTS

| JP | WO2018235191 | 12/2018 |
|----|--------------|---------|
| KR | 20150059955 | 6/2015 |
| KR | 1020160089749 | 7/2016 |
| KR | 101677648 | 11/2016 |
| KR | 20170141083 | 12/2017 |

OTHER PUBLICATIONS

KR Office Action in Korean Appln. No. 10-2019-7019304, dated Apr. 8, 2021, 4 pages (with English translation).
International Search Report in International Appln. No. PCT/KR2019/003072, dated Dec. 12, 2019, 5 pages (with English translation).

* cited by examiner

VEHICLE CONTROL DEVICE

CROSS-REFERENCE TO RELATED APPLICATIONS

This application is a National Stage application under 35 U.S.C. § 371 of International Application No. PCT/KR2019/003072, filed on Mar. 15, 2019, the disclosure of which is hereby incorporated by reference in its entirety.

TECHNICAL FIELD

The present invention relates to a method for controlling an autonomous vehicle.

BACKGROUND ART

A vehicle may be classified as an internal combustion engine vehicle, an external combustion engine vehicle, a gas turbine vehicle, or an electric vehicle depending on the type of motor used.

In recent years, smart vehicles have been actively developed for the safety or convenience of drivers, pedestrians, etc., and active research is ongoing on sensors mounted on smart vehicles. Cameras, infrared sensors, radar, GPS, Lidar, gyroscopes, etc. are being used in smart vehicles, among which cameras serve to substitute for human eyes.

Due to the development of various types of sensors and electronic equipment, vehicles with functions for assisting a passenger in driving and improving the safety and convenience of driving are attracting attention.

Notably, remote control of a device inside a vehicle by a driver's gesture is becoming an issue.

DISCLOSURE

Technical Problem

An aspect of the present invention is to provide a vehicle control device equipped in a vehicle.

Another aspect of the present invention is to provide a vehicle control device that forms a virtual control space to allow a driver to control a device inside a vehicle by gesture while keeping their eyes ahead.

Another aspect of the present invention is to provide a vehicle control device that varies a target device based on a passenger twisting the upper body.

Another aspect of the present invention is to provide a vehicle control device that remotely controls a device inside a vehicle by detecting a passenger's gesture.

Technical Solution

An exemplary embodiment of the present invention provides a vehicle control device including: an interface unit that is connected to a camera for capturing a vehicle passenger and to a plurality of devices installed inside the vehicle; and a processor that receives an image captured by the camera through the interface unit and exchanges information with the plurality of devices through the interface unit, wherein the processor detects the position of the passenger from the image acquired by the camera, configures a space adjacent to the passenger as a virtual control space, matches a device corresponding to the position of the passenger, among the plurality of devices, to the virtual control device, and, upon detecting a preset gesture through the virtual control space, controls the device based on the preset gesture.

The passenger may be positioned in a driver's seat, and a plurality of devices corresponding to the position of the passenger may be provided in front of the passenger, wherein the interface unit may be connected to a voice recognition unit installed inside the vehicle, and the processor may receive the passenger's voice recognized by the voice recognition unit through the interface unit, select one device corresponding to the position of the passenger from among the plurality of devices based on the passenger's voice, and match the selected device to the virtual control space.

The interface unit may be connected to a button provided inside the vehicle, and the processor may activate the voice recognition unit upon receiving an input into the button through the interface unit.

If the preset gesture is not detected from the virtual control space for a preset period of time after controlling the device based on the preset gesture, the processor may undo the matching of the selected device and the virtual control space.

Upon detecting a preset gesture through the virtual control space and detecting that the passenger's body is partially outside the virtual control space, the processor may control the device to correspond to the detected gesture and undo the matching of the selected device and the virtual control space.

The vehicle may include an assistant driver's seat spaced apart from the driver's seat, and the virtual control space may be positioned between the driver's seat and the assistant driver's seat.

The passenger may include a first passenger and a second passenger, and, if a device corresponding to the position of the first passenger and a device corresponding to the position of the second passenger are the same, and the first passenger is matched with the device earlier than the second passenger, the processor may give priority to the first passenger's gesture and control the device according to the priority.

The processor may configure the virtual control space in front of the first passenger.

The interface unit may be connected to a voice recognition unit that is installed inside the vehicle and detects the direction of a voice, and the processor may acquire the first passenger's voice and the first passenger's utterance position, sense the second passenger's voice based on the first passenger's utterance position, and perform noise cancelling on the second passenger's voice.

The device may be positioned in front of the passenger, and the virtual control space may be provided at a predetermined distance in front of the passenger and include a width corresponding to the shoulder width of the passenger.

The device may be positioned in front the passenger, the interface may be connected to a voice recognition unit installed inside the vehicle, and the processor may acquire the passenger's voice detected by the voice recognition unit through the interface unit and control the device based on the passenger's voice.

The device may be a first device, the virtual control space may be a first virtual control space, and the processor may detect a twist of the passenger's upper body from the image acquired by the camera, configure a space in front of the passenger as a second virtual control space based on the passenger twisting the upper body, match a second device corresponding to the passenger twisting the upper body, among the plurality of devices, to the second virtual control space, and, upon detecting a preset gesture from the second virtual control space, control the device based on the preset gesture.

The adjacent space may be at least one of a space positioned between the passenger and the device, a space positioned in front of the passenger, and a space positioned to one side of the passenger.

The processor may detect the passenger's field of view through the camera, pick out a plurality of devices positioned in the field of view, form a plurality of virtual control spaces respectively corresponding to the plurality of picked-out devices, match the plurality of picked-out devices and the plurality of virtual control devices, respectively, and, upon detecting the preset gesture through the plurality of virtual control spaces, control the device matched to the virtual control space where the preset gesture is detected.

The plurality of virtual control spaces may be spaced apart from one another, be positioned between the passenger and the plurality of picked-out devices, and surround the passenger.

Another exemplary embodiment of the present invention provides a vehicle control method including: detecting the position of a passenger from an image acquired by a camera for capturing a vehicle passenger; configuring a space adjacent to the passenger as a virtual control space; matching a device corresponding to the position of the passenger, among the plurality of devices, to the virtual control device, and; upon detecting a preset gesture through the virtual control space, controlling the device based on the preset gesture.

The passenger may be positioned in a driver's seat, and a plurality of devices corresponding to the position of the passenger may be provided, wherein the vehicle control method further includes: receiving the passenger's voice recognized by a voice recognition unit installed inside the vehicle; selecting one device corresponding to the position of the passenger from among the plurality of devices based on the passenger's voice; and matching the selected device to the virtual control space.

The vehicle control method may further include, upon receiving an input into a button provided inside the vehicle, activating the voice recognition unit.

The vehicle control method may further include, if the preset gesture is not detected from the virtual control space for a preset period of time after controlling the device based on the preset gesture, undoing the matching of the selected device and the virtual control space.

The vehicle control method may further include, upon detecting a preset gesture through the virtual control space and detecting that the passenger's body is partially outside the virtual control space, controlling the device to correspond to the detected gesture and undoing the matching of the selected device and the virtual control space.

The vehicle control method may further include, if the passenger includes a first passenger and a second passenger, a device corresponding to the position of the first passenger and a device corresponding to the position of the second passenger are the same, and the first passenger is matched with the device earlier than the second passenger, giving priority to the first passenger's gesture and controlling the device according to the priority.

The vehicle control method may further include: acquiring the first passenger's voice and the direction of the voice by a voice recognition unit installed inside the vehicle to detect the direction of voice; and performing noise cancelling on the second passenger's voice based on the direction of the voice.

The device may be a first device, the virtual control space may be a first virtual control space, and the vehicle control method may further include: detecting a twist of the passenger's upper body from the image acquired by the camera; configuring a space in front of the passenger as a second virtual control space based on the passenger twisting the upper body; matching a second device corresponding to the passenger twisting the upper body, among the plurality of devices, to the second virtual control space; and, upon detecting a preset gesture from the second virtual control space, controlling the device based on the preset gesture.

Advantageous Effects

According to at least one exemplary embodiment of the present invention, it is possible to provide a vehicle control device that forms a virtual control space to allow a driver to control a device inside a vehicle by gesture while keeping their eyes ahead.

According to at least one exemplary embodiment of the present invention, it is possible to provide a vehicle control device that varies a target device based on a passenger twisting the upper body.

According to at least one exemplary embodiment of the present invention, it is possible to provide a vehicle control device that remotely controls a device inside a vehicle by detecting a passenger's gesture.

MODE FOR INVENTION

Figure 1:
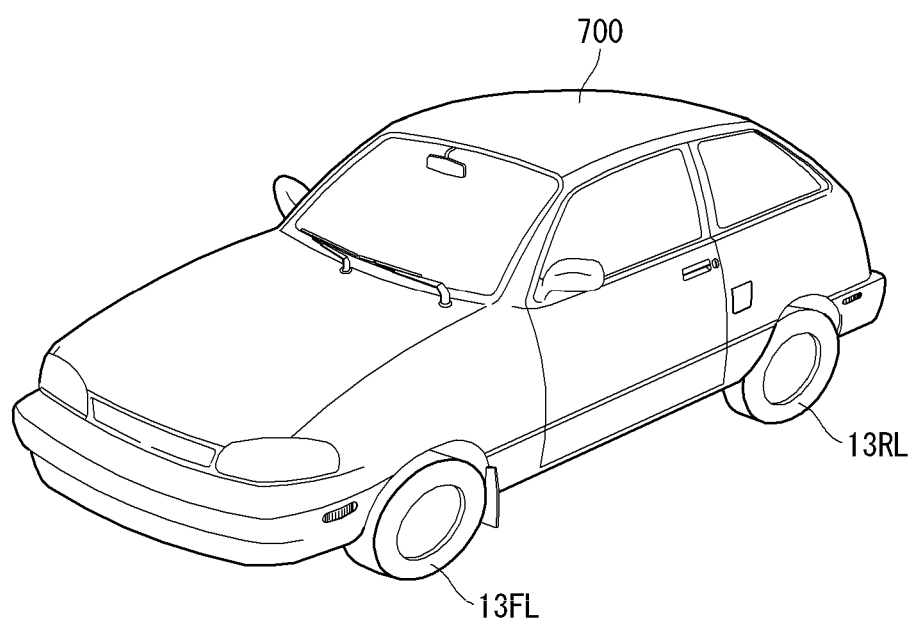
FIG. 1 shows an exterior appearance of a vehicle equipped with a vehicle control device according to an exemplary embodiment of the present invention.
Figure 1:
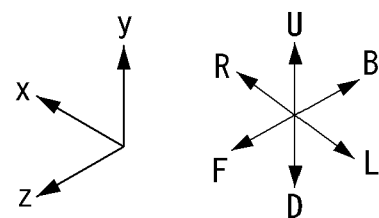

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle as described in this specification may include a car and a motorcycle. Hereinafter, a car will be as an example of a vehicle.

A vehicle as described in this specification may include all of an internal combustion engine vehicle including an engine as a power source, a hybrid vehicle including both an engine and an electric motor as a power source, and an electric vehicle including an electric motor as a power source.

In some implementations, the left of a vehicle means the left of the vehicle in the direction of travel and the right of the vehicle means the right of the vehicle in the direction of travel.

In some implementations, a left hand drive (LHD) vehicle will be assumed unless otherwise stated.

Hereinafter, a user, a driver, a passenger, and a fellow passenger may be used interchangeably depending on the embodiment.

In the following description, the vehicle control device 400 is a separate device provided in the vehicle 700, and may exchange necessary information with the vehicle 700 through data communication. The vehicle control device 400 may include at least some of the units of the vehicle 700. The vehicle control device 400 may be referred to as a control device 400, a driving assistance device 400, a vehicle driving assistance device 400, or an assistance device 400.

Alternatively, at least some of the units of the vehicle control device 400 may be a unit(s) of the vehicle 700 or of another device mounted in the vehicle 700. Such external units may be understood as being included in the vehicle control device 400 by transmitting and receiving data through an interface unit of the vehicle control device 400.

FIG. 1 shows an exterior appearance of a vehicle 700 equipped with a vehicle control device 400 according to an exemplary embodiment of the present invention. Referring to FIG. 1, the vehicle 700 may include wheels 13FL and 12RL rotating by a power source.

Figure 2:
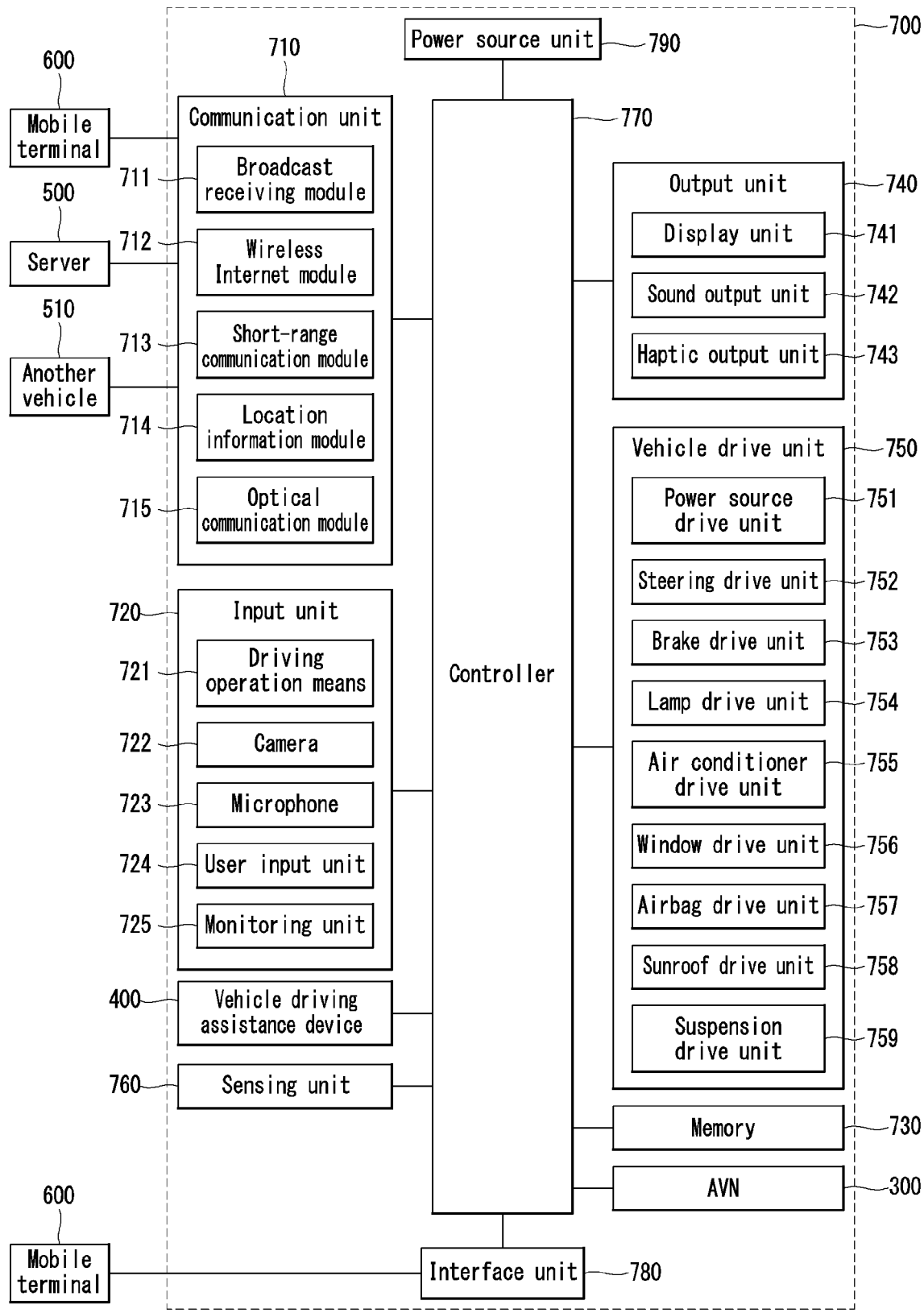
FIG. 2 is an internal block diagram illustrating one example of the vehicle.

FIG. 2 is an internal block diagram illustrating one example of the vehicle 700. The vehicle may include a communication unit 710, an input unit 720, a sensing unit 760, an output unit 740, a vehicle drive unit 750, a memory 730, an interface unit 780, a controller 770, a power source unit 790, a control device 400, and an AVN apparatus 300. The communication unit 710 may include one or more modules to enable the wireless communication between the vehicle and the mobile terminal 600, between the vehicle and an external server 500, or between the vehicle and another vehicle 510. In addition, the communication unit 710 may include one or more modules to connect the vehicle to one or more networks.

The communication unit 710 may include a broadcast receiving module 711, a wireless Internet module 712, a short-range communication module 713, a location information module 714, and an optical communication module 715.

The broadcast receiving module 711 is configured to receive a broadcast signal or broadcast associated information from an external broadcast managing server via a broadcast channel. Here, broadcast includes radio broadcast or TV broadcast.

The wireless Internet module 712 is a module for wireless Internet access. The wireless Internet module 712 may be internally or externally coupled to the vehicle 700. The wireless Internet module 712 may transmit or receive wireless signals via communication networks according to wireless Internet technologies.

Examples of such wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), and LTE-A (Long Term Evolution-Advanced). The wireless Internet module 712 may transmit and receive data according to one or more of such wireless Internet technologies, and other Internet technologies as well. For example, the wireless Internet module 712 may exchange data with the external server 500 in a wireless manner. The wireless Internet module 712 may receive weather information and road traffic state information (e.g., Transport Protocol Expert Group (TPEG) information) from the external server 500.

The short-range communication module 713 may assist short-range communication using at least one selected from among Bluetooth™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication module 713 forms wireless area networks to perform the short-range communication between the vehicle 700 and at least one external device. For example, the short-range communication module 713 may exchange data with the mobile terminal 600 in a wireless manner. The short-range communication module 713 may receive weather information and road traffic state information (e.g., Transport Protocol Expert Group (TPEG) information) from the mobile terminal 600. When the user boards the vehicle 700, the mobile terminal 600 of the user and the vehicle 700 may pair with each other automatically or as the user executes a pairing application.

The location information module 714 is a module to acquire a location of the vehicle 700. A representative example of the location information module 714 includes a Global Position System (GPS) module. For example, when the vehicle utilizes a GPS module, a location of the vehicle may be acquired using signals transmitted from GPS satellites.

The optical communication module 715 may include a light emitting unit and a light receiving unit.

The light receiving unit may convert light into electrical signals to receive information. The light receiving unit may include Photo Diodes (PDs) to receive light. The photo diodes may convert light into electrical signals. For example, the light receiving unit may receive information regarding a preceding vehicle via light emitted from a light source included in the preceding vehicle.

The light emitting unit may include at least one light emitting element to convert electrical signals into light. Here, the light emitting element may be a Light Emitting Diode (LED). The light emitting unit converts electrical signals into light to thereby emit the light. For example, the light emitting unit may externally emit light via flickering of the light emitting element corresponding to a prescribed frequency. In some embodiments, the light emitting unit may include an array of a plurality of light emitting elements. In some embodiments, the light emitting unit may be integrated with a lamp provided in the vehicle 700. For example, the light emitting unit may be at least one selected from among a headlight, a taillight, a brake light, a turn signal light, and a sidelight. For example, the optical communication module 715 may exchange data with another vehicle 510 via optical communication.

The input unit 720 may include a driving operation unit 721, a camera 722, a microphone 723, and a user input unit 724.

The driving operation unit 721 is configured to receive user input for the driving of the vehicle. The driving operation unit 721 may include a steering input unit 721*a*, a shift input unit 721*b*, an acceleration input unit 721*c*, and a brake input unit 721*d*.

The camera 722 may include an image sensor and an image processing module. The camera 722 may process a still image or a moving image acquired by the image sensor (e.g., a CMOS or a CCD). The image processing module may extract required information by processing a still image or a moving image acquired via the image sensor and, then, may transmit the extracted information to the controller 770. Meanwhile, the vehicle 700 may include the camera 722 to capture a forward image or a surround-view image of the vehicle and a monitoring unit 725 to capture an image of the interior of the vehicle.

The monitoring unit 725 may capture an image of a passenger. The monitoring unit 725 may capture an image of biometrics of the passenger.

The microphone 723 may process external sound signals into electrical data. The processed data may be utilized in various ways according to a function that the vehicle 700 is performing. The microphone 723 may convert a user voice command into electrical data. The converted electrical data may be transmitted to the controller 770.

Meanwhile, in some embodiments, the camera 722 or the microphone 723 may be components of the sensing unit 760, other than components of the input unit 720.

The user input unit 724 is configured to receive information from the user. When information is input via the user input unit 724, the controller 770 may control the operation of the vehicle 700 to correspond to the input information.

The user input unit 724 may include a touch input unit or a mechanical input unit. In some embodiments, the user input unit 724 may be located in a region of the steering wheel. In this case, the driver may operate the user input unit 724 with the fingers while gripping the steering wheel.

The sensing unit 760 is configured to sense signals associated with, for example, the traveling of the vehicle 700. To this end, the sensing unit 760 may include a collision sensor, a wheel sensor, a speed sensor, gradient sensor, a weight sensor, a heading sensor, a yaw sensor, a gyro sensor, a position module, a vehicle forward/backward movement sensor, a battery sensor, a fuel sensor, a tire sensor, a steering sensor based on the rotation of a steering wheel, a vehicle interior temperature sensor, a vehicle interior humidity sensor, an ultrasonic sensor, an infrared sensor, a radar, and Lidar.

As such, the sensing unit 760 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/backward movement information, battery information, fuel information, tire information, vehicle lamp information, vehicle interior temperature information, vehicle interior humidity information, and steering wheel rotation angle information.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 may include a biometric information sensing unit. The biometric information sensing unit is configured to sense and acquire biometric information of the passenger. The biometric information may include fingerprint information, iris-scan information, retina-scan information, hand geometry information, facial recognition information, and voice recognition information. The biometric information sensing unit may include a sensor to sense biometric information of the passenger. Here, the monitoring unit 725 and the microphone 723 may operate as sensors. The biometric information sensing unit may acquire hand geometry information and facial recognition information via the monitoring unit 725.

The output unit 740 is configured to output information processed in the controller 770. The output unit 740 may include a display unit 741, a sound output unit 742, and a haptic output unit 743.

The display unit 741 may display information processed in the controller 770. For example, the display unit 741 may display vehicle associated information. Here, the vehicle associated information may include vehicle control information for the direct control of the vehicle or driver assistance information to guide vehicle driving. In addition, the vehicle associated information may include vehicle state information that notifies a current state of the vehicle or vehicle traveling information regarding the traveling of the vehicle.

The display unit 741 may include at least one selected from among a liquid crystal display (LCD), a thin film transistor liquid-crystal display (TFT LCD), an organic light-emitting diode (OLED), a flexible display, a 3D display, and an e-ink display.

The display unit 741 may configure an inter-layer structure with a touch sensor, or may be integrally formed with the touch sensor to implement a touchscreen. The touchscreen may function as the user input unit 724 which provides an input interface between the vehicle 700 and the user and also function to provide an output interface between the vehicle 700 and the user. In this case, the display unit 741 may include a touch sensor which senses a touch to the display unit 741 so as to receive a control command in a touch manner.

When a touch is input to the display unit 741 as described above, the touch sensor may sense the touch and the controller 770 may generate a control command corresponding to the touch. Content input in a touch manner may be characters or numbers, or may be, for example, instructions in various modes or menu items that may be designated.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like. Hereinafter, a touch or a touch input may generally refer to various types of touches mentioned above.

Meanwhile, the display unit 741 may include a cluster to allow the driver to check vehicle state information or vehicle traveling information while driving the vehicle. The cluster may be located on a dashboard. In this case, the driver may check information displayed on the cluster while looking forward.

Meanwhile, in some embodiments, the display unit 741 may be implemented as a Head Up display (HUD). When the display unit 741 is implemented as a HUD, information may be output via a transparent display provided at the windshield. Alternatively, the display unit 741 may include a projector module to output information via an image projected to the windshield.

The sound output unit 742 is configured to convert electrical signals from the controller 770 into audio signals and to output the audio signals. To this end, the sound output unit 742 may include, for example, a speaker. The sound output unit 742 may output sound corresponding to the operation of the user input unit 724.

The haptic output unit 743 is configured to generate tactile output. For example, the haptic output unit 743 may operate to vibrate a steering wheel, a safety belt, or a seat so as to allow the user to recognize an output thereof.

The vehicle drive unit 750 may control the operation of various devices of the vehicle. The vehicle drive unit 750 may include at least one of a power source drive unit 751, a steering drive unit 752, a brake drive unit 753, a lamp drive unit 754, an air conditioner drive unit 755, a window drive unit 756, an airbag drive unit 757, a sunroof drive unit 758, and a suspension drive unit 759.

The power source drive unit 751 may perform electronic control for a power source inside the vehicle 700. For example, in the case where a fossil fuel based engine (not illustrated) is a power source, the power source drive unit 751 may perform electronic control for the engine. As such, the power source drive unit 751 may control, for example, an output torque of the engine. In the case where the power source drive unit 751 is the engine, the power source drive unit 751 may control the speed of the vehicle by controlling the output torque of the engine under the control of the controller 770. In another example, when an electric motor (not illustrated) is a power source, the power source drive unit 751 may perform control for the motor. As such, the power source drive unit 751 may control, for example, the RPM and torque of the motor.

The steering drive unit 752 may include a steering apparatus. As such, the direction of travel of the vehicle may be changed.

The brake drive unit 753 may perform electronic control of a brake apparatus (not illustrated) inside the vehicle 700. For example, the brake drive unit 753 may reduce the speed of the vehicle 700 by controlling the operation of brakes located at wheels. In another example, the brake drive unit 753 may adjust the direction of travel of the vehicle 700 leftward or rightward by differentiating the operation of respective brakes located at left and right wheels.

The lamp drive unit 754 may turn at least one lamp arranged inside and outside the vehicle 700 on or off. The lamp drive unit 754 may include a lighting apparatus. In addition, the lamp drive unit 754 may control, for example, the intensity and direction of light of each lamp included in the lighting apparatus. For example, the lamp drive unit 754 may perform control for a turn signal lamp, a headlamp or a brake lamp.

The air conditioner drive unit 755 may perform the electronic control of an air conditioner (not illustrated) inside the vehicle 700. For example, when the interior temperature of the vehicle 700 is high, the air conditioner drive unit 755 may operate the air conditioner to supply cold air to the interior of the vehicle 700.

The window drive unit 756 may perform the electronic control of a window apparatus inside the vehicle 700. For example, the window drive unit 756 may control the opening or closing of left and right windows of the vehicle 700.

The airbag drive unit 757 may perform the electronic control of an airbag apparatus inside the vehicle 700. For example, the airbag drive unit 757 may control an airbag to be deployed in a dangerous situation.

The sunroof drive unit 758 may perform electronic control of a sunroof apparatus inside the vehicle 700. For example, the sunroof drive unit 758 may control the opening or closing of a sunroof.

The suspension drive unit 759 may perform electronic control on a suspension apparatus (not shown) inside the vehicle 700. For example, when the road surface is uneven, the suspension drive unit 759 may control the suspension apparatus to reduce vibration of the vehicle 700.

The memory 730 is electrically connected to the controller 770. The memory 730 may store basic data for each unit, control data for the operation control of the unit, and input/output data. The memory 730 may be various hardware storage devices such as, for example, a ROM, a RAM, an EPROM, a flash drive, and a hard drive. The memory 730 may store various data for the overall operation of the vehicle 700 such as, for example programs for the processing or control of the controller 770.

The interface unit 780 may serve as a passage for various kinds of external devices that are connected to the vehicle 700. For example, the interface unit 780 may have a port that is connectable to the mobile terminal 600 and may be connected to the mobile terminal 600 via the port. In this case, the interface unit 780 may exchange data with the mobile terminal 600.

Meanwhile, the interface unit 780 may serve as a passage for the supply of electrical energy to the connected mobile terminal 600. When the mobile terminal 600 is electrically connected to the interface unit 780, the interface unit 780 supplies electrical energy from the power source unit 790 to the mobile terminal 600 under the control of the controller 770.

The controller 770 may control the overall operation of each unit inside the vehicle 700. The controller 770 may be referred to as an Electronic Control Unit (ECU).

The controller 770 may execute a function corresponding to an execution signal delivered from the control device 100.

The controller 770 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The power source unit 790 may supply power required to operate the respective components under the control of the controller 770. In particular, the power source unit 790 may receive power from, for example, a battery (not illustrated) inside the vehicle 700.

The AVN apparatus 300 may exchange data with the controller 770. The controller 770 may receive navigation information from the AVN apparatus 300 or a separate navigation apparatus (not illustrated). Here, the navigation information may include set destination information, destination based routing information, and map information or vehicle location information related to vehicle traveling.

The vehicle control device 400 may be understood as included in the vehicle 700.

Figure 3:
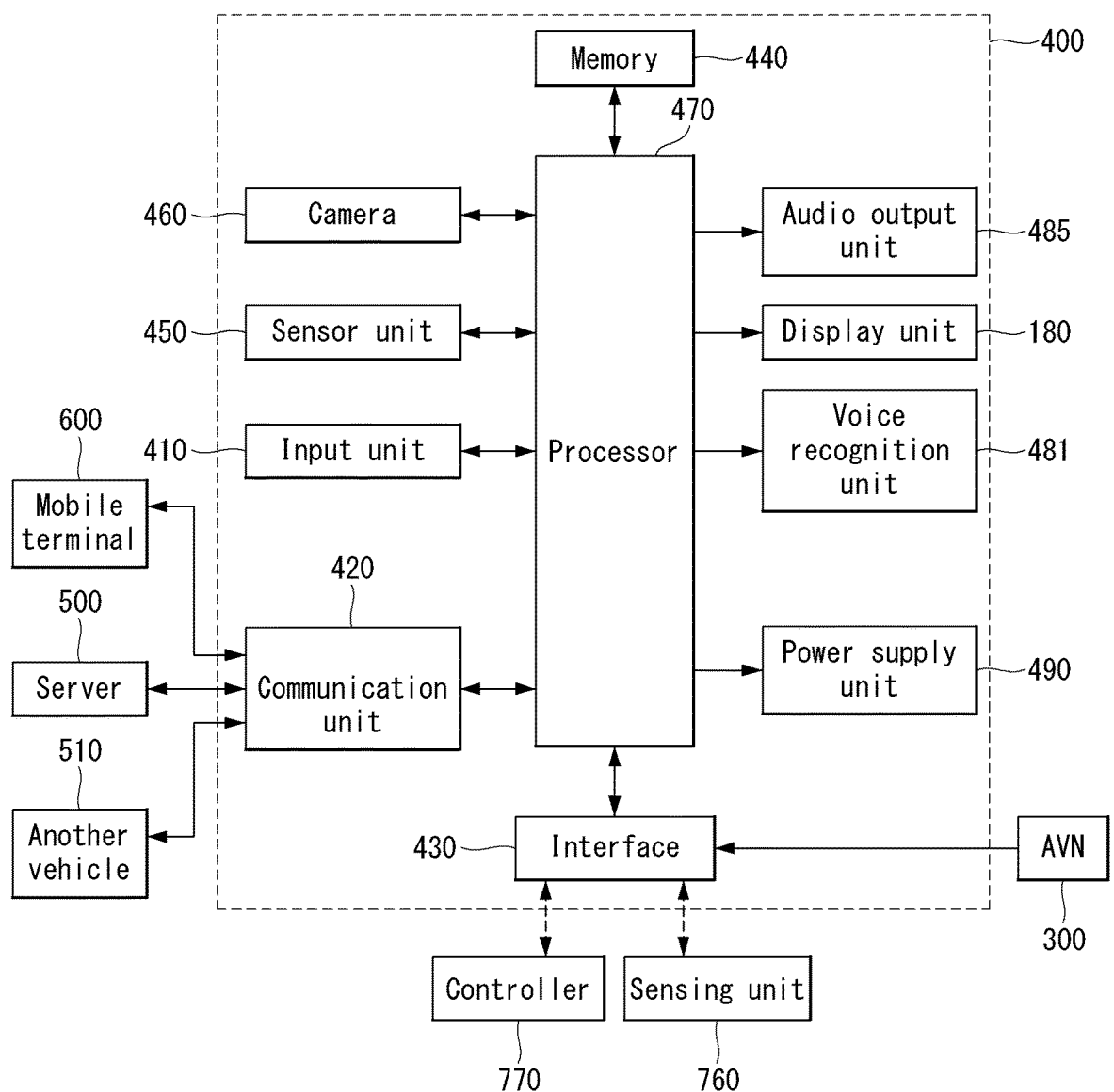
FIG. 3 is an internal block diagram illustrating one example of the vehicle control device according to an exemplary embodiment of the present invention.

FIG. 3 is an internal block diagram illustrating one example of the vehicle control device 400 according to an exemplary embodiment of the present invention. Referring to FIG. 3, the vehicle control device 400 may include an input unit 410, a communication unit 420, an interface 430, a memory 440 a camera 460, a sensor unit 450, a processor 470, an audio output unit 485, and a power supply unit 490. The vehicle control device 400 may include additional components in addition to the above-described components, or some of the above-described components may be omitted. Here, units of the same names, among the units included in the vehicle control device 400 and the units included in the vehicle 700 may be included in the vehicle 700 or the vehicle control device 400.

The vehicle control device 400 may include the input unit 410 for receiving user input. For example, a user may input settings for a sliding function provided by the vehicle control device 400 through the input unit 410, or may input execution of power on/off of the vehicle control device 400.

The input unit 410 may include at least one of a gesture input unit (e.g., an optical sensor, etc.) for sensing a user gesture, a touch input unit (e.g., a touch sensor, a touch key, a push key (mechanical key), etc.) for sensing touch, and a microphone for sensing voice input and receive user input.

Next, the vehicle control device 400 may include the communication unit 420 for communicating with another vehicle 510, a terminal 600 and a server 500. The communication unit 420 may be referred to as a wireless communication unit 420.

The vehicle control device 400 may receive communication information including at least one of navigation information, another vehicle 510's traveling information, and traffic information through the communication unit 420. The vehicle control device 400 may send information about the vehicle 700 through the communication unit 420.

The communication unit 420 may receive at least one of position information, weather information and road traffic condition information (e.g., transport protocol experts group (TPEG), etc.) from the mobile terminal 600 and/or the server 500.

The communication unit 420 may receive traffic information from the server 500 having an intelligent traffic system (ITS). Here, the traffic information may include traffic signal information, lane information, vehicle surrounding information or position information.

In addition, the communication unit 420 may receive navigation information from the server 500 and/or the mobile terminal 600. Here, the navigation information may include at least one of map information related to vehicle driving, lane information, vehicle position information, set destination information and route information according to the destination.

For example, the communication unit 420 may receive the real-time position of the vehicle as the navigation information. In detail, the communication unit 420 may include a global positioning system (GPS) module and/or a Wi-Fi (Wireless Fidelity) module and acquire the position of the vehicle.

In addition, the communication unit 420 may receive driving information of another vehicle 510 from the another vehicle 510 and transmit information on this vehicle, thereby sharing driving information between vehicles. Here, the shared driving information may include vehicle traveling direction information, position information, vehicle speed information, acceleration information, moving route information, forward/reverse information, adjacent vehicle information and turn signal information.

In addition, when a user rides in the vehicle, the mobile terminal 600 of the user and the vehicle control device 400 may pair with each other automatically or by executing a user application.

The communication unit 420 may exchange data with the another vehicle 510, the mobile terminal 600 or the server 500 in a wireless manner. The communication unit 420 may perform wireless communication using a wireless data communication method. As the wireless data communication method, technical standards or communication methods for mobile communications (for example, Global System for Mobile Communication (GSM), Code Division Multiple Access (CDMA), CDMA2000 (Code Division Multiple Access 2000), EV-DO (Evolution-Data Optimized), Wideband CDMA (WCDMA), High Speed Downlink Packet Access (HSDPA), HSUPA (High Speed Uplink Packet Access), Long Term Evolution (LTE), LTE-A (Long Term Evolution-Advanced), and the like) may be used.

The communication unit 420 is configured to facilitate wireless Internet technology. Examples of such wireless Internet technology include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

The communication unit 420 is configured to facilitate short-range communication. For example, short-range communication may be supported using at least one of Bluetooth™ Radio Frequency Identification (RFID), Infrared Data Association (IrDA), Ultra-Wideband (UWB), ZigBee, Near Field Communication (NFC), Wireless-Fidelity (Wi-Fi), Wi-Fi Direct, Wireless USB (Wireless Universal Serial Bus), and the like.

In addition, the vehicle control device 400 may pair with the mobile terminal located inside the vehicle using a short-range communication method and wirelessly exchange data with the other vehicle 510 or the server 500 using a long-distance wireless communication module of the mobile terminal.

Next, the vehicle control device 400 may include the interface 430 for receiving data of the vehicle 700 and transmitting a signal processed or generated by the processor 470.

The vehicle control device 400 may receive at least one of driving information of another vehicle, navigation information and sensor information via the interface 430.

To this end, the interface 430 may perform data communication with at least one of the controller 770 of the vehicle, an audio-video-navigation (AVN) apparatus 300, and the sensing unit 760 using a wired or wireless communication method. The interface 430 may receive navigation information by data communication with the controller 770, the AVN apparatus 300 and/or a separate navigation apparatus. In addition, the interface 430 may receive sensor information from the controller 770 or the sensing unit 760.

Here, the sensor information may include at least one of vehicle traveling direction information, vehicle position information, vehicle speed information, acceleration information, vehicle tilt information, forward/reverse information, fuel information, information on a distance from a preceding/rear vehicle, information on a distance between a vehicle and a lane and turn signal information, etc.

The sensor information may be acquired from a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor using handle rotation, a vehicle inside temperature sensor, a vehicle inside humidity sensor, a door sensor, etc. The position module may include a GPS module for receiving GPS information.

The interface 430 may receive user input via the user input unit 410 of the vehicle. The interface 430 may receive user input from the input unit of the vehicle or via the controller 770. That is, when the input unit is provided in the vehicle, user input may be received via the interface 430.

In addition, the interface 430 may receive traffic information acquired from the server. The server 500 may be located at a traffic control surveillance center for controlling traffic. For example, when traffic information is received from the server 500 via the communication unit 420 of the vehicle, the interface 430 may receive traffic information from the controller 770.

Next, the memory 440 may store a variety of data for overall operation of the vehicle control device 400, such as a program for processing or control of the processor 470.

In addition, the memory 440 may store data and commands for operation of the vehicle control device 400 and a plurality of application programs or applications executed in the vehicle control device 400. At least some of such application programs may be downloaded from an external server through wireless communication. At least some of such application programs may be installed in the vehicle control device 400 upon release. Such application programs may be stored in the memory 440, and may be executed to perform operation (or function) of the vehicle control device 400 by the processor 470.

The memory 440 may store data for checking an object included in an image. For example, the memory 440 may store data for checking a predetermined object using a predetermined algorithm when the predetermined object is detected from an image of the vicinity of the vehicle acquired through the camera 460. For example, the memory 440 may store data for checking a predetermined object such as a passenger, garbage, or a lost item from an image acquired through the camera 460.

The memory 440 may be implemented in a hardware manner using at least one selected from among a flash memory, a hard disk, a solid state drive (SSD), a silicon disk drive (SDD), a micro multimedia card, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc.

In addition, the vehicle control device 400 may operate in association with a web storage for performing a storage function of the memory 440 over the Internet.

The sensor unit 450 may acquire information on the internal state of the vehicle 700. The sensor unit 450 may sense an object or thing within the vehicle 700. Alternatively, the camera 460 may capture a passenger in the vehicle 700.

The camera 460 may capture the inside of the vehicle 700. The camera 460 may capture the surroundings of the vehicle control device 400. Alternatively, the camera 460 may capture the surroundings of a seat where the vehicle control device 400 is installed. Alternatively, the camera 460 may capture a passenger in the seat.

A display unit 180 may commonly refer to a display device installed inside the vehicle. The display unit 180 may be referred to as a display 180 or a display device 180.

The processor 470 may be referred to as a control unit 470 or a controller 470. The processor 470 may detect an object in the vicinity of the vehicle control device 400 through the camera 460. Alternatively, the processor 470 may detect a passenger, the passenger's gaze, or the passenger's movement through the camera 460. The processor 470 may control a voice recognition unit 481.

Figure 4:
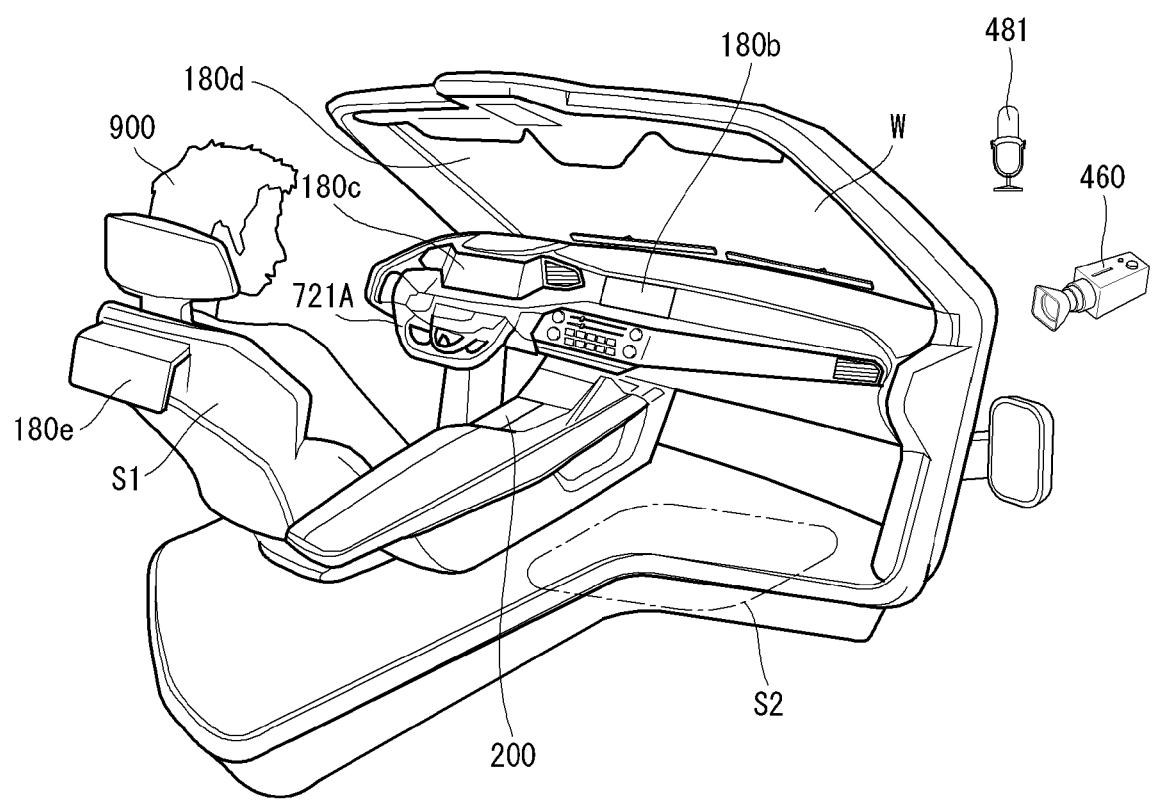
FIG. 4 shows the inside of the vehicle equipped with the vehicle control device according to an exemplary embodiment of the present invention.

FIG. 4 shows the inside of the vehicle 700 equipped with the vehicle control device 400 according to an exemplary embodiment of the present invention. Referring to FIG. 4, a camera may be installed inside the vehicle 700. The camera may capture the interior space of the vehicle 700. The camera 460 may capture a driver's seat. Alternatively, the camera 460 may capture a driver 900 sitting in the driver's seat S1. Alternatively, the camera 460 may capture the vicinity of the driver's seat S1, the vicinity of a control board 200, and the vicinity of an assistant driver's seat S2. The camera 460 may acquire a captured image of the driver 900 at regular time intervals. The voice recognition unit 481 may recognize voice inside the vehicle 700.

The control board 200 may be installed inside the vehicle 700. The control board 200 may be positioned to one side of the driver's seat S1. Alternatively, the control board 200 may be positioned between the driver's seat S1 and the assistant driver's seat S2. The control board 200 may be referred to as a center console 200 or a console 200.

The display 180 may include at least one of a liquid crystal display (LCD), a thin film transistor-liquid crystal display (TFT LCD), an organic light-emitting diode (OLED), a flexible display, a 3D display, and an e-ink display. The display 180 may be referred to as a display unit 180.

The display 180 may configure an inter-layer structure with a touch sensor, or may be integrally formed with the touch sensor to implement a touchscreen. The touchscreen may function as the user input unit 724 which provides an input interface between the vehicle 700 and the user and also function to provide an output interface between the vehicle 700 and the user. In this case, the display 180 may include a touch sensor which senses a touch to the display 180 so as to receive a control command in a touch manner.

When a touch is input to the display 180 as described above, the touch sensor may sense the touch and the processor 470 may execute a control command corresponding to the touch. Content input in a touch manner may be characters or numbers, or may be, for example, instructions in various modes or menu items that may be designated.

The display 180 may commonly refer to a cluster 180c installed inside the vehicle 700, a center display 180b, a head-up display 180d formed on a front window W of the vehicle 700, and a display 180e installed to face a back seat.

FIGS. 5 to 9 are views showing an embodiment in which a device inside the vehicle 700 is controlled with respect to the driver's seat.

Figure 5:
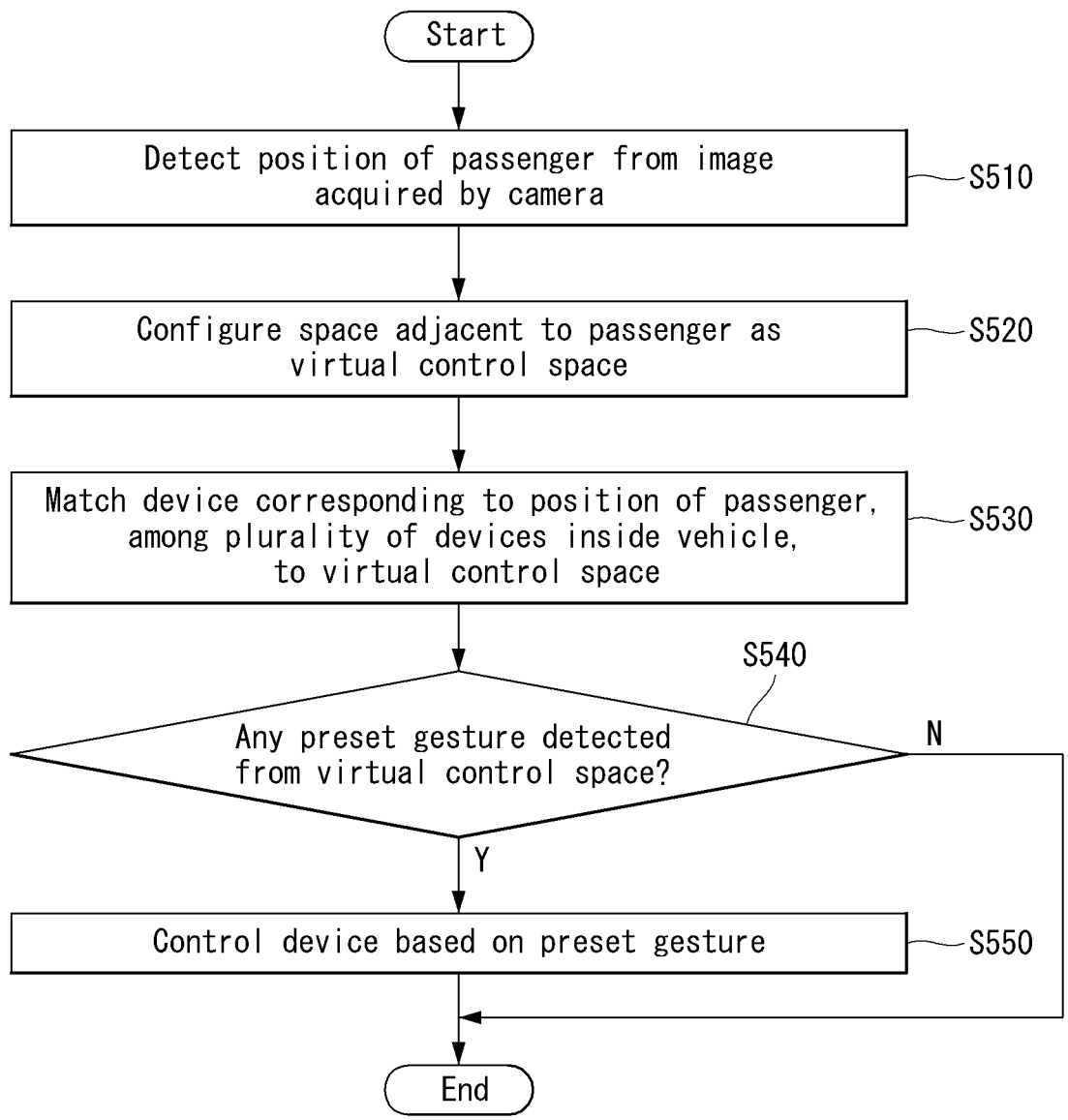
FIGS. 5 to 9 are views showing an embodiment in which a device inside the vehicle is controlled with respect to the driver's seat.

Referring to FIG. 5, the processor 470 may detect the position of a passenger from an image acquired by the camera 460 (S510). The processor 470 may detect a passenger sitting in the driver's seat.

The processor 470 may configure a space adjacent to the passenger as a virtual control space (S520). The virtual control space may be a space inside the vehicle 700. The virtual control space may be referred to as a control space, a space, a gesture box, a control box, or a control area. The virtual control space may be formed over the control board 200. For example, the virtual control space may be in the shape of a cuboid. The virtual control space may be positioned to the right side of the driver 901. The virtual control space may be adjacent to the right hand of the driver 901.

The processor 470 may match a device corresponding to the position of the passenger, among a plurality of devices inside the vehicle 700, to the virtual control space (S530). The device corresponding to the position of the driver 901 may be a device positioned in front of the driver 901. For example, the device corresponding to the position of the driver 901 may be a device, such as an air conditioner, an audio device, or a media device, that controls a function of the vehicle 700. If a device and the virtual control space are matched, the processor 470 may determine that an input detected through the virtual control space is an input on the device. The matched device may be referred to as an area of interest.

The processor 470 may determine whether a preset gesture is detected from the virtual control space (S540). The processor 470 may control the device based on the preset gesture (S550).

For example, the preset gesture may involve putting a hand up, and the processor 470 may increase the volume of the audio based on this gesture. As another example, the preset gesture may involve putting a hand down, and the processor 470 may lower the volume of the audio based on this gesture.

As another example, the preset gesture may involve moving a hand to the right, and the processor 470 may turn up the air conditioner based on this gesture. As another example, the preset gesture may involve moving a hand to the left, and the processor 470 may turn down the air conditioner based on this gesture.

For example, the preset gesture may involve putting a hand up, and the processor may increase the set temperature of the air conditioner based on this gesture. As another example, the preset gesture may involve putting a hand down, and the processor 470 may lower the set temperature of the air conditioner based on this gesture.

As another example, the preset gesture may involve moving a hand to the left or right, and the processor 470 may switch between channels on the radio.

Figure 6:
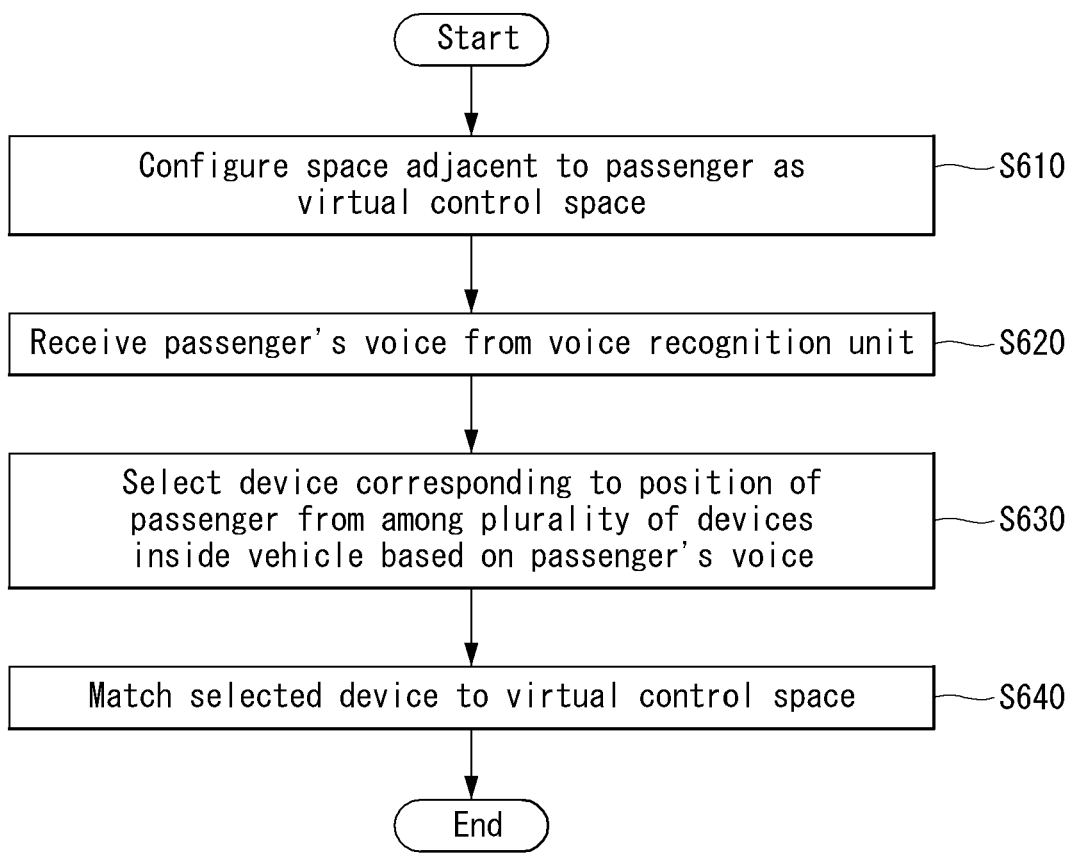

Referring to FIG. 6, the processor 470 may configure a space adjacent to a passenger as a virtual control space (S610). The processor 470 may receive the passenger's voice from the voice recognition unit 481 (S620). The processor 470 may select a device corresponding to the position of the passenger from among a plurality of devices inside the vehicle 700 based on the passenger's voice (S630). The processor 470 may match the selected device to the virtual control space (S640).

A plurality of devices may be provided inside the vehicle 700, corresponding to the position of the driver 901, and it may be necessary to select a device from among the plurality of devices, in order to match the virtual control device and the device. In this case, the passenger's voice is for selecting a device from among the plurality of devices. For example, the radio may be matched to the virtual control space based on a voice saying "radio volume" or "radio channel". As another example, the air conditioner may match the air conditioner to the virtual control space based on a voice saying "air conditioning", "air conditioner", or "heater". As another example, the media device may be matched to the virtual control space based on "media volume" or "media channel".

The driver 901 may activate the voice recognition unit 481 by pressing a button provided inside the vehicle 700. For example, the button may be provided on the steering wheel.

Figure 7:
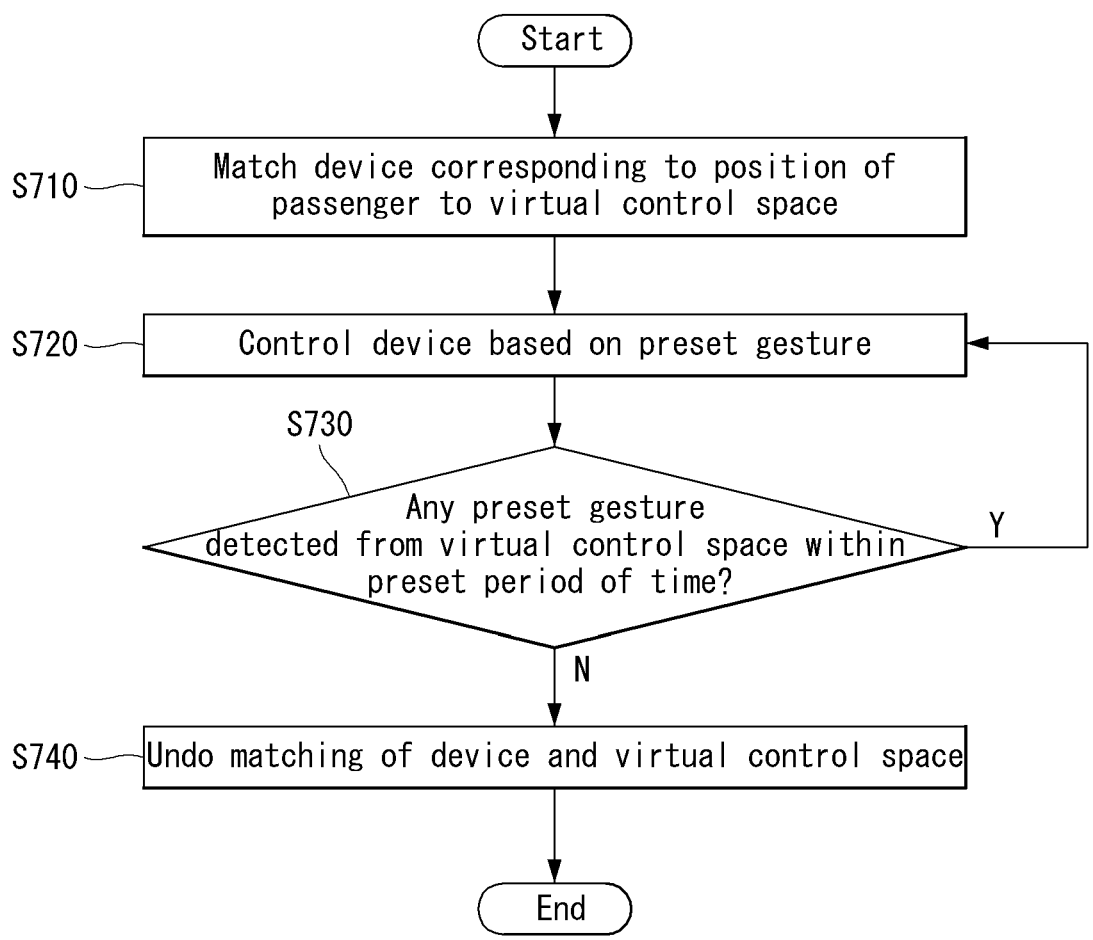

Referring to FIG. 7, the processor 470 may match a device corresponding to the position of a passenger to a virtual control space (S710). The processor 470 may control the device based on a preset gesture (S720). The processor 470 may determine whether the preset gesture is detected through the virtual control space within a preset period of time (S730). If the preset gesture is not detected through the virtual control space within a preset period time, the processor 470 may undo the matching of the device and the virtual control space (S740). As another example, if no preset gesture is detected through the virtual control space within a preset period of time, the processor 470 may undo the matching of the device to the virtual control space.

Figure 8:
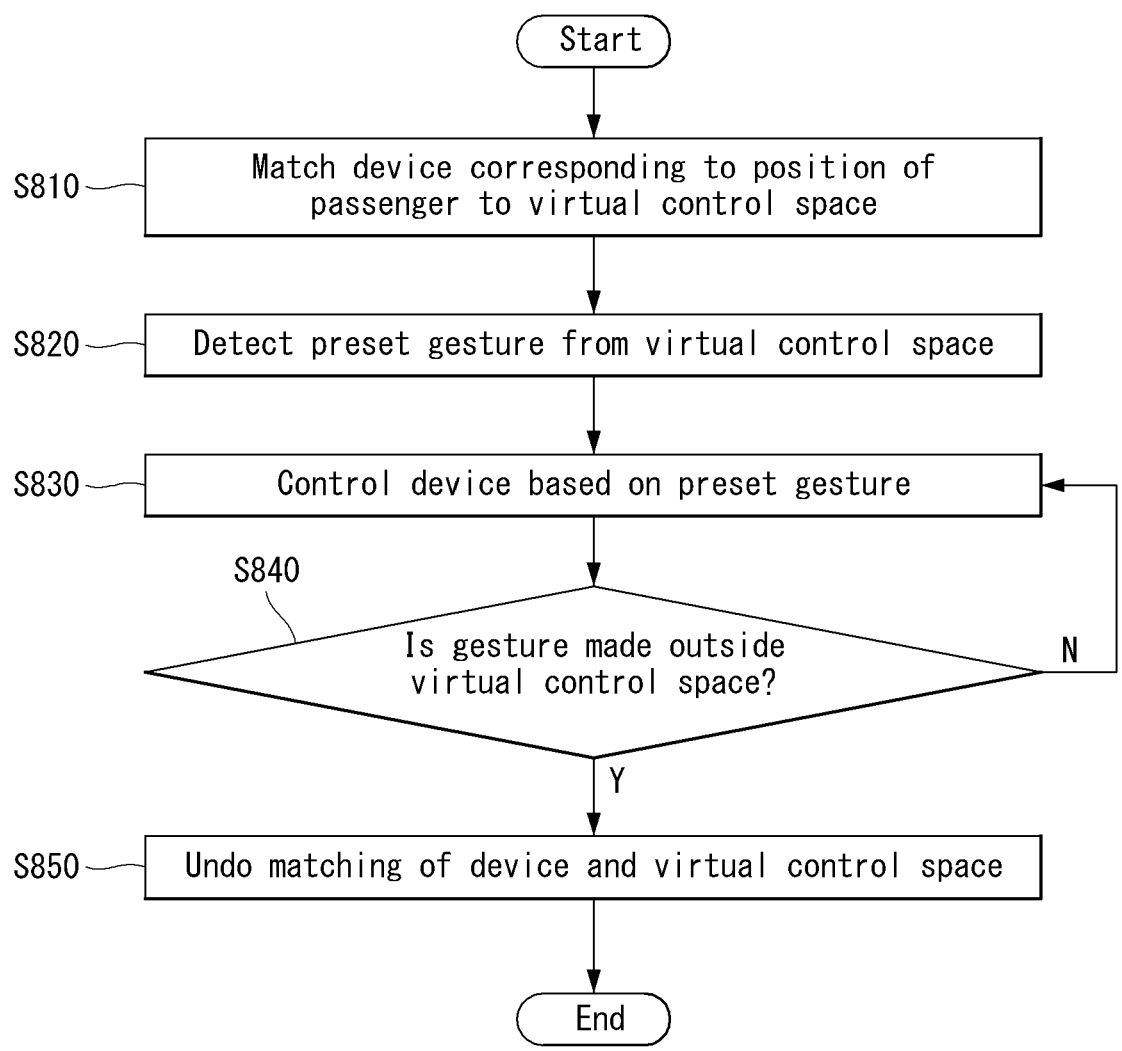

Referring to FIG. 8, the processor 470 may match a device corresponding to the position of a passenger to a virtual control space (S810). The passenger may be the driver 901. The processor 470 may detect a preset gesture through the virtual control space (S820). The processor 470 may control the device based on the preset gesture (S830). The processor 470 may determine whether the passenger's gesture is made outside the virtual control space (S840). If it is determined that the passenger's gesture is made outside the virtual control space, the processor 470 may undo the matching of the device and the virtual control space and the virtual control space (S850).

Device control through the virtual control space may be done only one time. For example, if the driver 901 increases the audio volume by a gesture of putting a hand up, the matching of the audio and the virtual control space may be undone. Even if the driver 901 accesses the virtual control space later, the audio may not be controlled. As such, the driver 901 may control a device in the vehicle 700 while looking ahead when driving the vehicle 700. Also, the driver 901 may not be confused or misled since device control through the virtual control space is done only one time.

Figure 9:
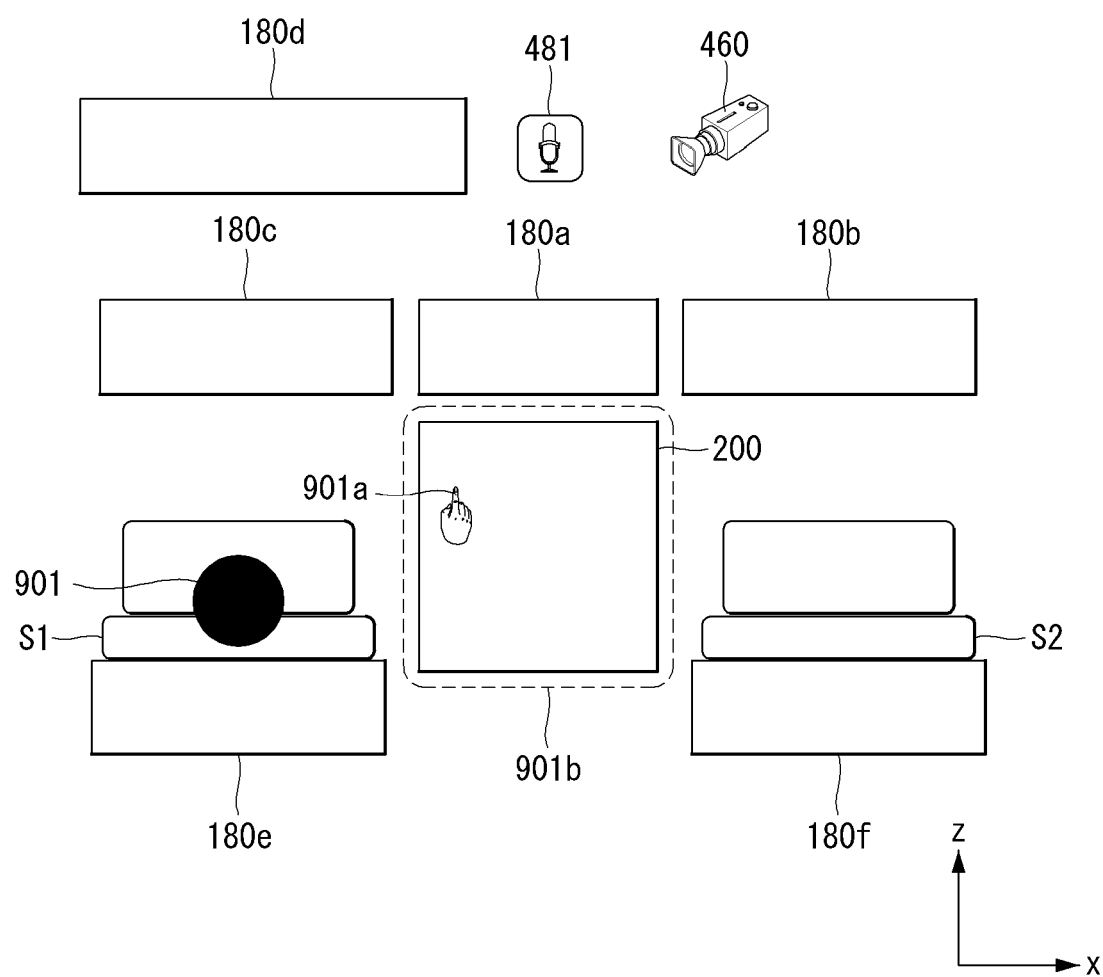

Referring to FIG. 9, the vehicle 700 may be equipped with displays 180a, 180b, 180c, 180d, 180e, and 180f as invehicle devices. The displays 180e and 180f may display an image toward a passenger sitting in a back seat. The passenger 901 sitting in the driver's seat S1 may control the display 180a displaying AVN by entering a gesture 901a into the virtual control space 901b which is formed over the control board 200.

FIGS. 10 to 15 are views showing an embodiment in which a device inside the vehicle 700 is controlled with respect to a passenger seat, not the driver's seat.

Figure 10:
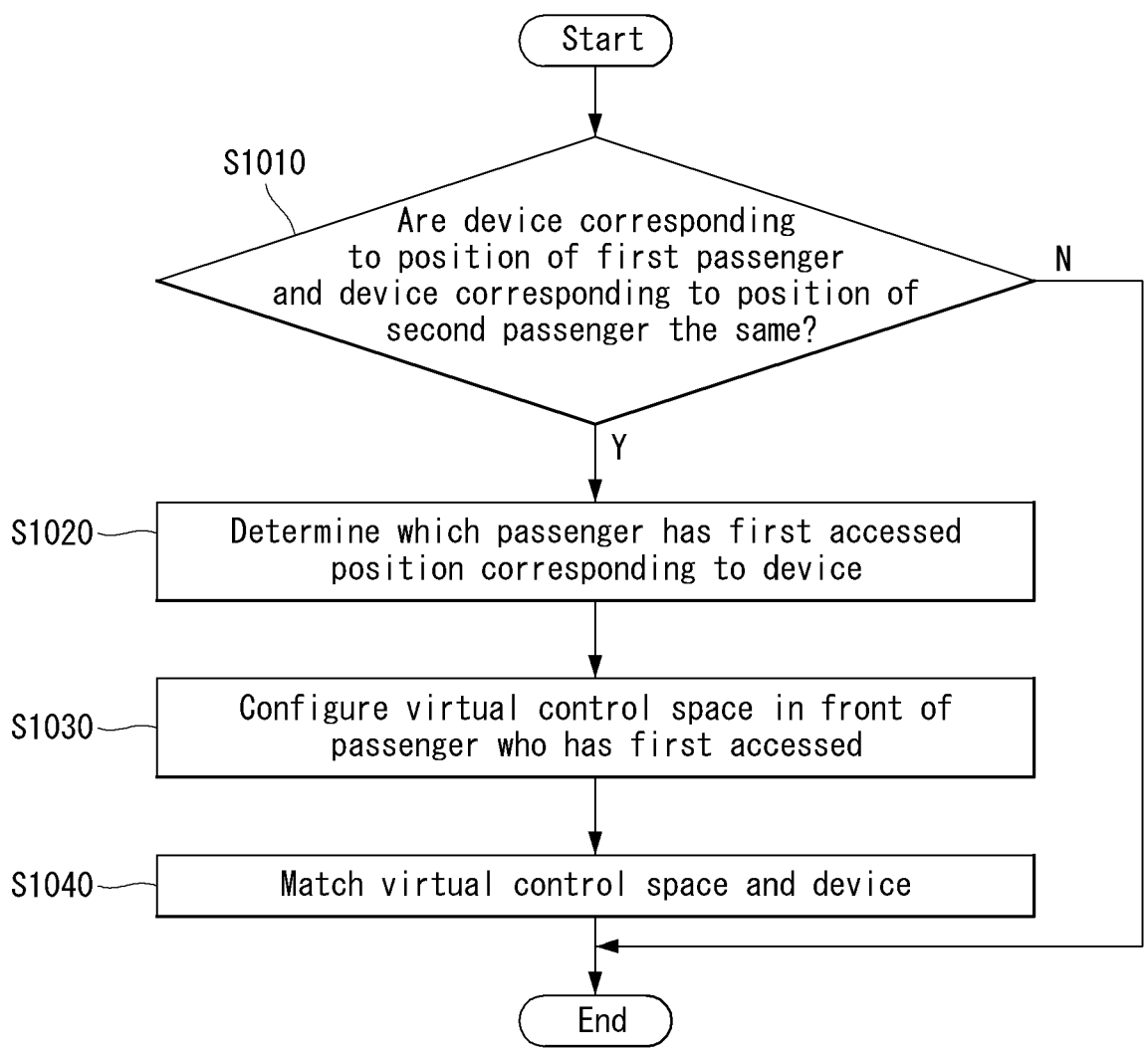
FIGS. 10 to 15 are views showing an embodiment in which a device inside the vehicle is controlled with respect to a passenger seat, not the driver's seat.

Referring to FIG. 10, the processor 470 may determine whether a device corresponding to the position of a first passenger and a device corresponding to the position of a second passenger are the same (S1010). As for a back seat of the vehicle 700, a plurality of passengers may sit in it close to one another. As such, the same device may be positioned in front of the first and second passengers adjacent to each other, and this same device may correspond to both the position of the first passenger and the position of the second passenger.

The processor 470 may determine which passenger has first accessed the position corresponding to the device (S1020). The processor 470 may determine which of the first and second passengers has been first matched with the device.

The processor 470 may configure a virtual control space in front of the passenger who has first accessed (S1030). For example, if the first passenger is matched with the device earlier than the second passenger, the processor 470 may configure the virtual control space close to the first passenger.

The processor 470 may match the virtual control space and the device (S1040). For example, if the first passenger is matched with the device earlier than the second passenger, the processor 470 may configure the virtual control space close to the first passenger and match the virtual control space to the device.

Figure 11:
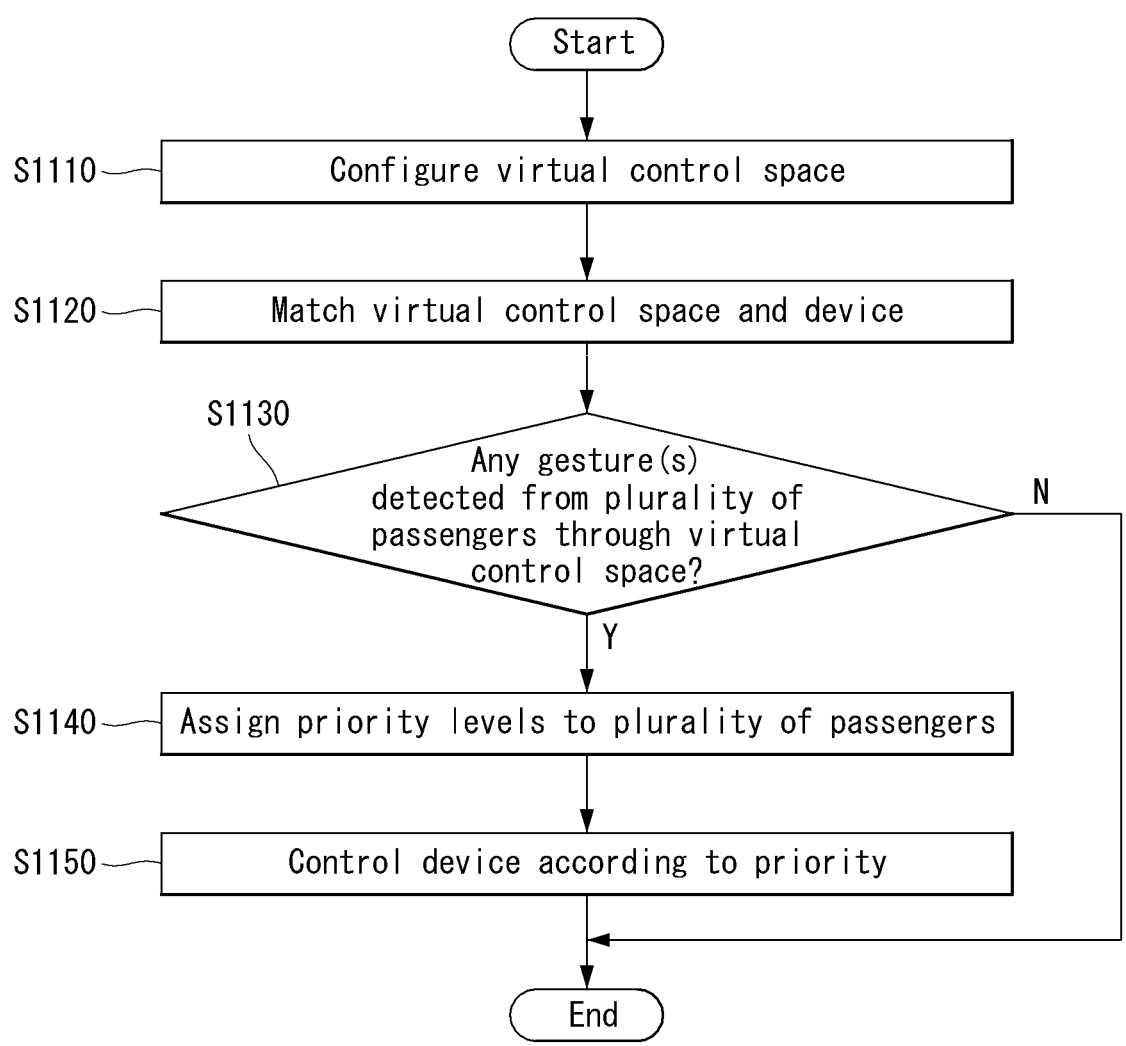

Referring to FIG. 11, the processor 470 may configure a virtual control space (S1110). The processor 470 may match the virtual control space and a device (S1120). The processor 470 may determine if any gesture(s) are detected from a plurality of passengers through the virtual control space (S1130). Upon detecting gestures from the plurality of passengers through the virtual control space, the processor 470 may assign priority levels to the plurality of passengers (S1140). The processor may control the device according to the priority (S1150).

For example, the processor 470 may assign priority levels to the passengers in the order they enter a gesture, and may control the device sequentially according to the priority based on a plurality of gestures. As another example, the processor 470 may give priority to a passenger whom the virtual control space is configured with respect to. As another example, the processor 470 may control the device based only on a top priority passenger's gesture. As another example, the processor 470 may assign priority levels to multiple gestures in the order the gestures are entered, and control the device sequentially in that order. As another example, the processor 470 may assign priority levels to multiple gestures in the order the gestures are entered, and control the device based only on a top priority gesture.

Figure 12:
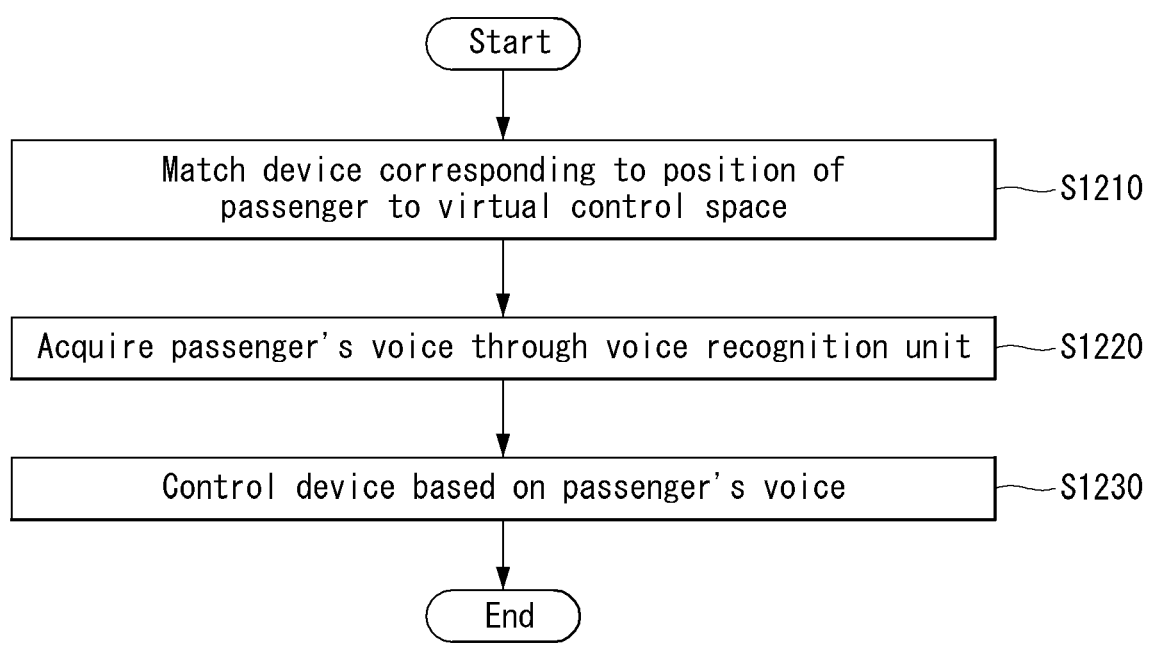

Referring to FIG. 12, the processor 470 may match a device corresponding to the position of a passenger to a virtual control space (S1210). The processor 470 may acquire the passenger's voice through the voice recognition unit 481 (S1220). The processor 470 may control the device based on the passenger's voice (S1230).

For example, the passenger may control the display by uttering a voice command while controlling the display through the virtual control space. For example, the voice command may be a command for moving to specific content on the display. For example, if the passenger utters "navigation" while the display is showing music playback and music playback control images, the display may show a navigation image.

Figure 13:
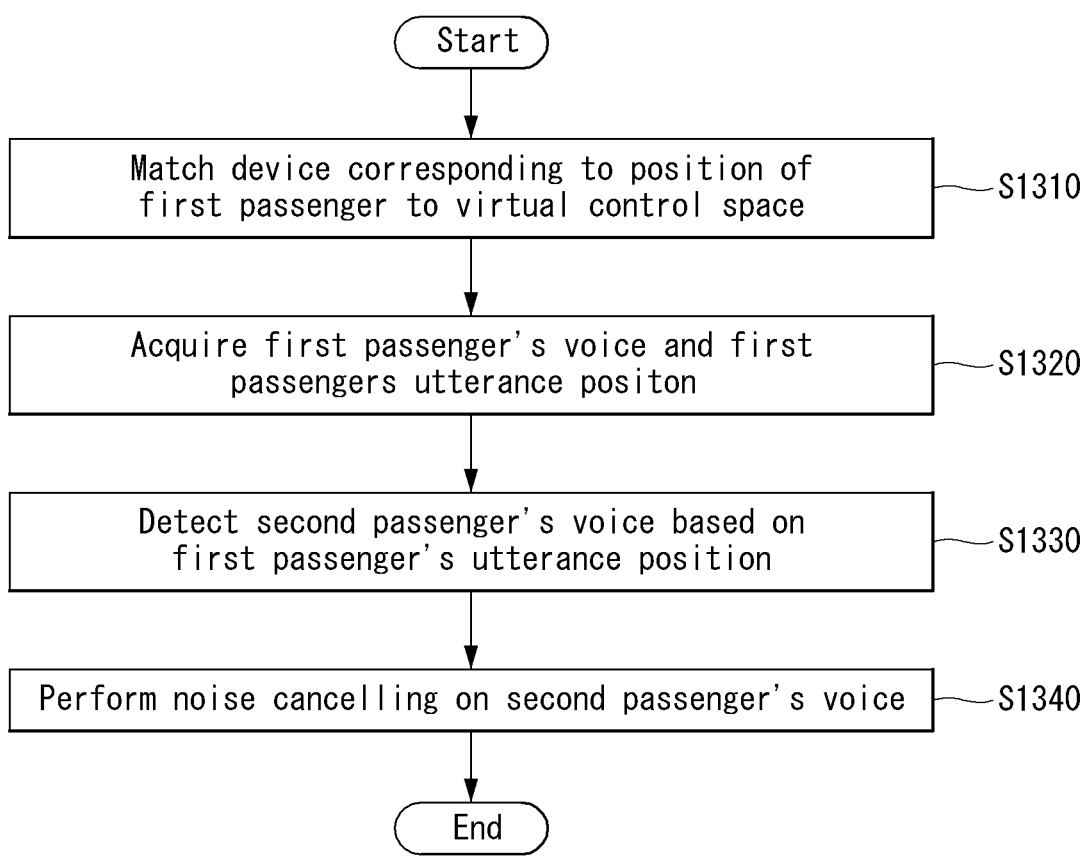

Referring to FIG. 13, the processor 470 may match a device corresponding to the position of a first passenger to a virtual control space (S1310). The processor 470 may acquire the first passenger's voice and the first passenger's utterance position through the voice recognition unit 481 (S1320). The voice recognition unit 481 may detect the direction of a recognized sound. For example, the voice recognition unit 481 may be a directional microphone or a directional speaker that detects the direction of sound. The processor 470 may detect the position of the first passenger through the voice recognition unit 481.

The processor 470 may detect a second passenger's voice based on the first passenger's utterance position (S1330). The processor 470 may distinguish between sounds detected from the first passenger's utterance position and sounds detected from other utterance positions.

The processor 470 may perform noise cancelling on the second passenger's voice (S1340). Noise cancelling can also be referred to as noise reduction or active noise reduction. The processor 470 may detect the first passenger's voice with a high resolution by performing noise cancelling on other passengers' utterances.

Figure 14:
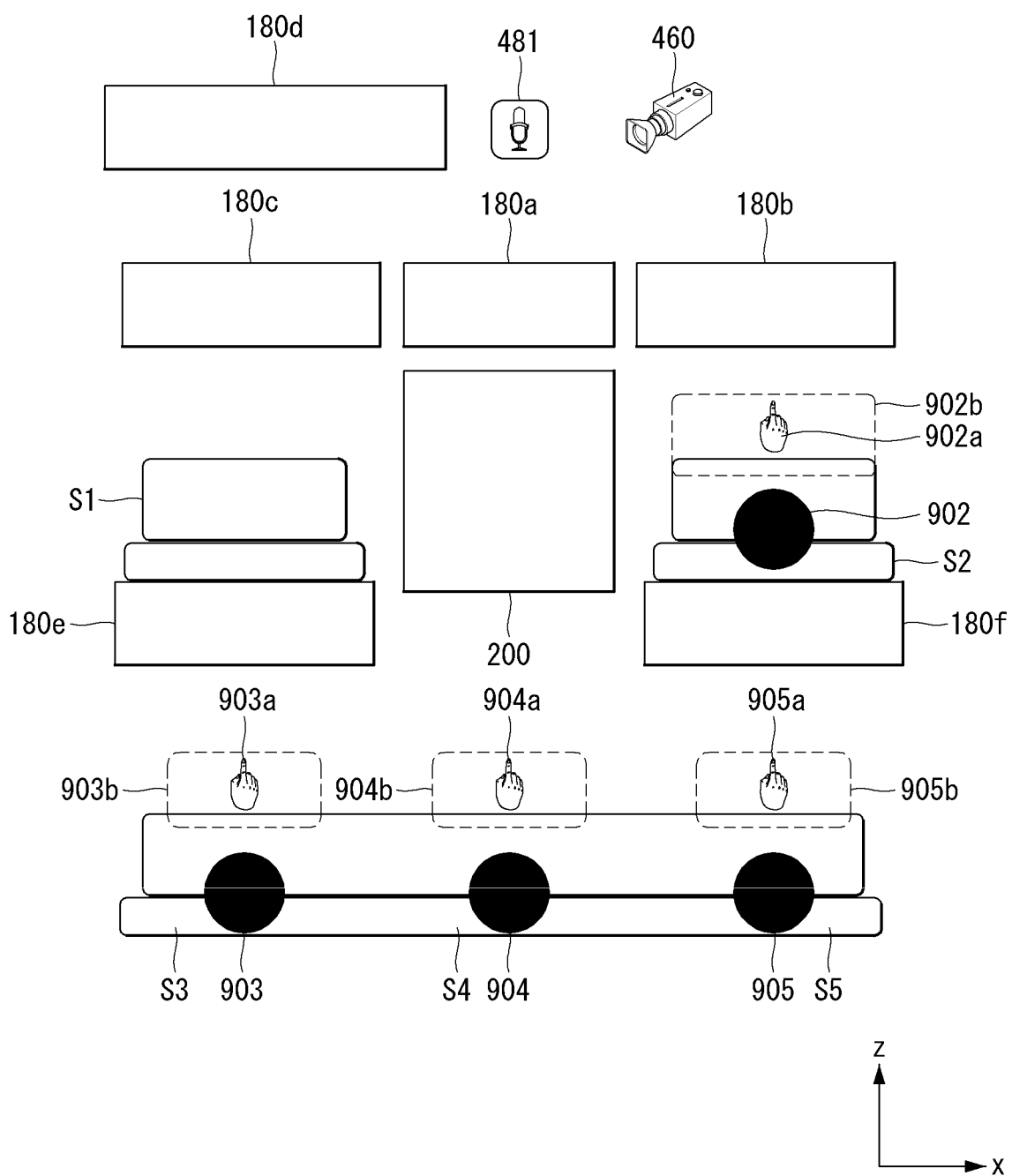

Referring to FIG. 14, a second seat S2 may correspond to the display 180b, and a second passenger 902 sitting in the second seat S2 may correspond to the display 180b positioned in front of the second passenger 902 and control the display 180b by entering a gesture 902a into a virtual control space 902b formed in front of the second passenger 902.

A third seat S3 may correspond to the display 180e, and a third passenger 903 sitting in the third seat S3 may correspond to the display 180e positioned in front of the third passenger 903 and control the display 180e by entering a gesture 903a into a virtual control space 903b formed in front of the third passenger 903.

A fourth seat S4 may correspond to the display 180a, and a fourth passenger 904 sitting in the fourth seat S4 may correspond to the display 180a positioned in front of the fourth passenger 904 and control the display 180a by entering a gesture 904a into a virtual control space 904b formed in front of the fourth passenger 904.

A fifth seat S5 may correspond to the display 180f, and a fifth passenger 905 sitting in the fifth seat S5 may correspond to the display 180f positioned in front of the fifth passenger 905 and control the display 180f by entering a gesture 905a into a virtual control space 905b formed in front of the fifth passenger 905.

Figure 15:
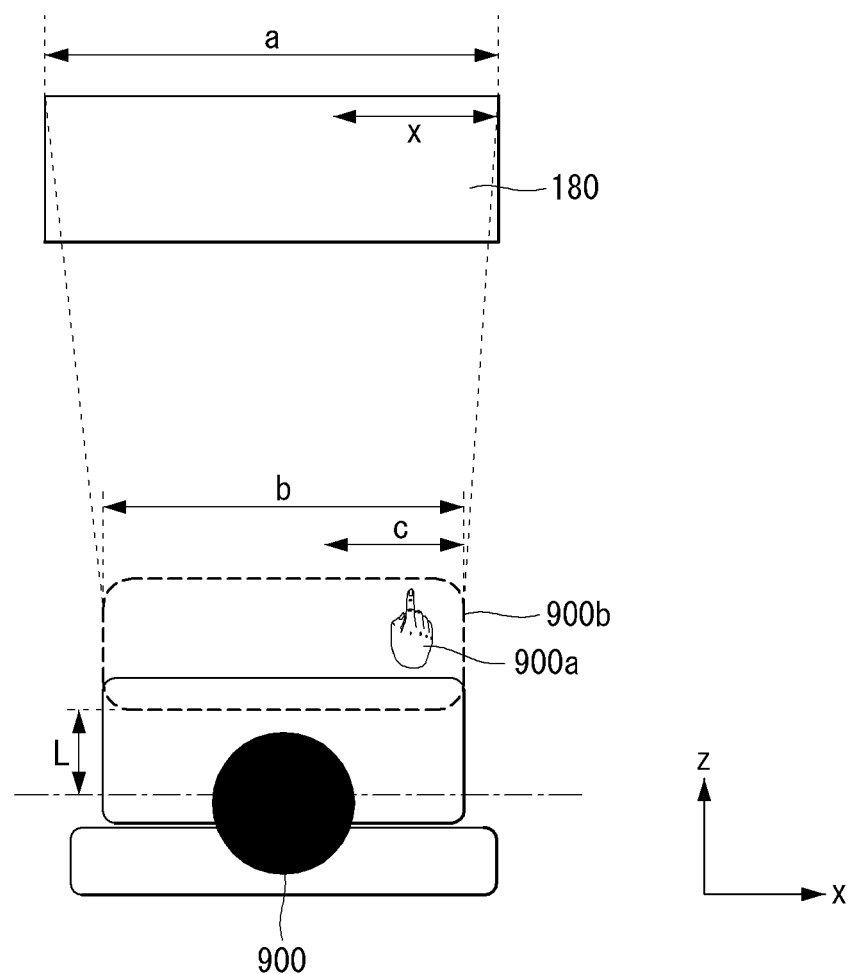

Referring to FIG. 15, a passenger may control a display in front of the passenger through a virtual control space. The virtual control space may be provided at a distance L in front of the passenger. For example, the distance L may be 200 mm. The lateral length b of the virtual control space is almost the same as the shoulder width of the passenger. The processor 470 may detect the shoulder width of the passenger, and the virtual control space may have a lateral length which is almost the shoulder width of the passenger.

If the passenger moves his or her fingertip a length c to the left or right in the virtual control space, the processor 470 may determine that it has moved a lateral length x on the display by taking into account the ratio of the lateral length a of the display to the lateral length b of the virtual control space. That is, the processor 470 may calculate the length x by using a proportional expression: length a:length b=length c:length x.

For example, upon detecting a lateral movement of the passenger's fingertip, the processor 470 may make a change to the content on the display. Also, upon detecting a vertical movement of the passenger's fingertip, the processor 470 may control the display in such a way that the corresponding content is selected on the display. A vertical movement of the passenger's fingertip may be referred to as an air mouse.

Figure 16:
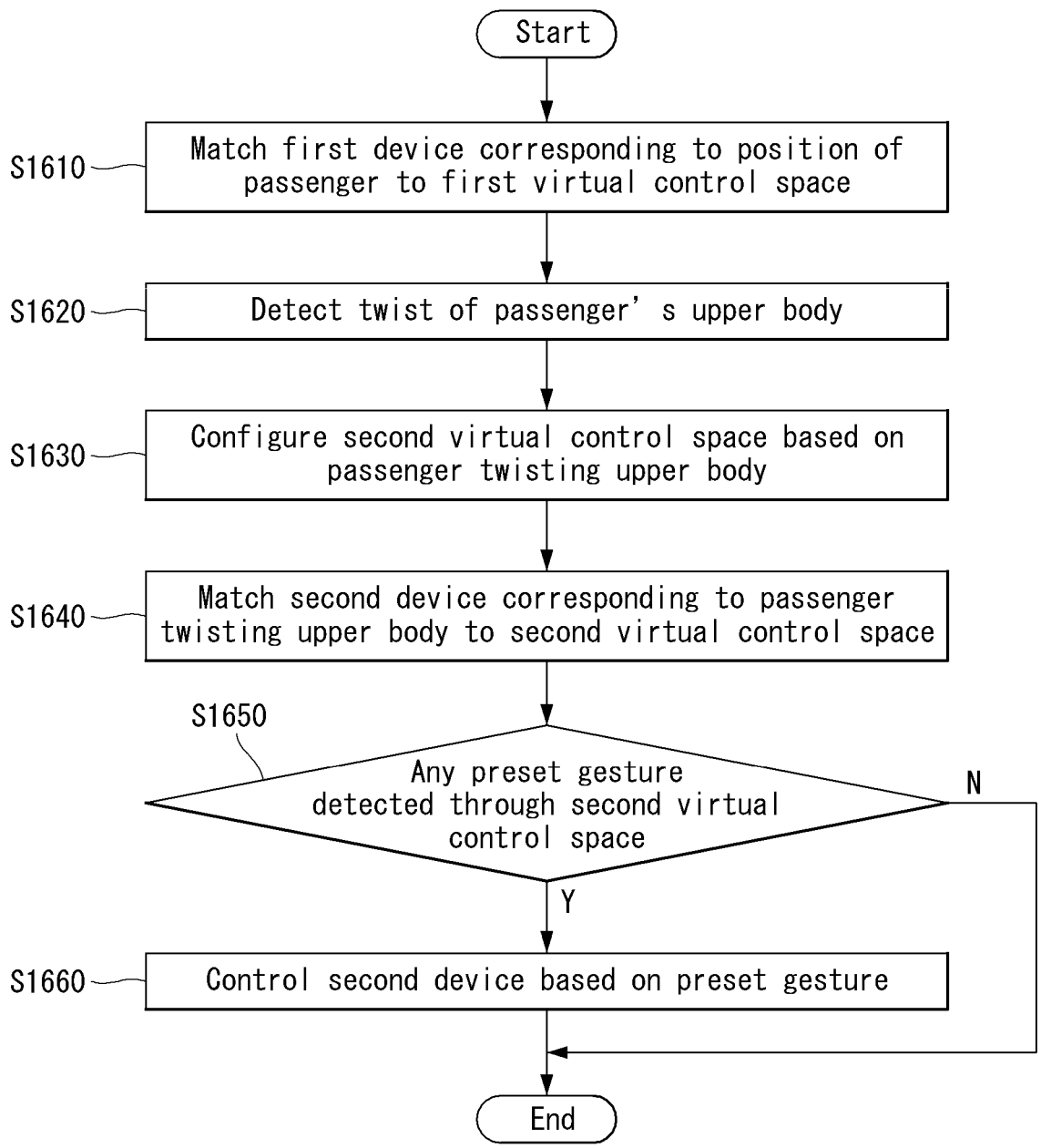
FIGS. 16 and 17 are views showing an embodiment in which a device to be controlled from a passenger seat is changed.
Figure 17:
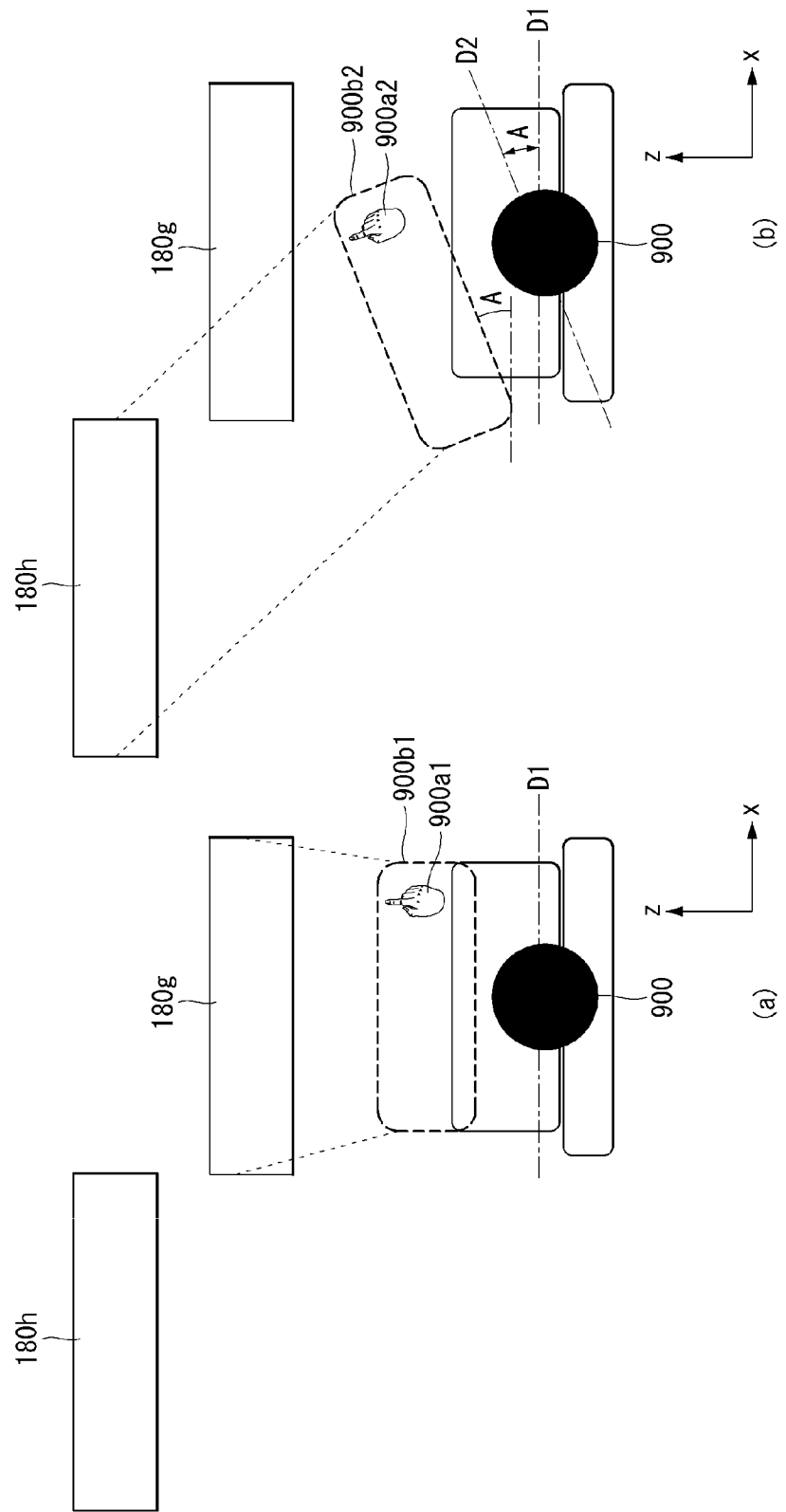

FIGS. 16 and 17 are views showing an embodiment in which a device to be controlled from a passenger seat is changed.

Referring to FIG. 16, the processor 470 may match a first device corresponding to the position of a passenger to a first virtual control space (S1610). The processor 470 may detect a twist of the passenger's upper body (S1620). If the passenger is not twisting the upper body, this means that the passenger's back is in full contact with the seat and looking ahead. The processor 470 may detect a twist of the passenger's upper body through the camera 460. The twist of the passenger's upper body may be measured with respect to the y axis.

The processor 470 may configure a second virtual control space based on the passenger twisting the upper body (S1630). The second virtual control space may be formed in front of the passenger with respect to the direction of the passenger's gaze. Alternatively, the second virtual control space may be twisted in shape as much as the passenger's upper body is.

The processor 470 may match a second device corresponding to the passenger twisting the upper body to the second virtual control space (S1640). When the second virtual control space and the second device are matched, the processor 470 may undo the matching of the first virtual control space and the first device.

The processor 470 may determine whether a preset gesture is detected from the second virtual control space (S1650).

The processor 470 may control the second device based on the preset gesture (S1660). The processor 470 may not undo the matching of the first virtual control space and the first device even if the second virtual control space and the second device are matched, and, if there is a gesture input in an area where the second virtual control space and the first virtual control space overlap, while the passenger's upper body is twisted, the processor 470 may control the second device. If the passenger untwists the upper body, the processor 470 may undo the matching of the second virtual control space and the second device.

Alternatively, the processor 470 may configure the second virtual control space match the second virtual control space and the second device, based on a change in the direction of the passenger's gaze, instead of a twist of the passenger's upper body. The processor 470 may detect the direction of the passenger's gaze through the camera 460 and detect a change in the direction of the passenger's gaze.

Referring (a) of FIG. 17, the processor 470 may match a first virtual control space 900b1 and a display 180g, and control the display 180g based on a gesture 900a1 from the passenger 900.

Referring to (b) of FIG. 17, the passenger 900's upper body may be twisted at an angle toward a reference line D2 from a reference line D1. Alternatively, the passenger 900's upper body may be twisted at an angle A from the reference line D1. If the passenger 900's upper body is twisted at the angle A, the passenger 900 may correspond to a display 180h. The display 180h may be positioned in the direction the passenger 900's upper body faces or in the direction of the passenger 900's gaze.

The processor 470 may match the second virtual control space 900b2 and the display 180h, and control the display 180h based on a gesture 900a2 from the passenger 900.

Figure 18:
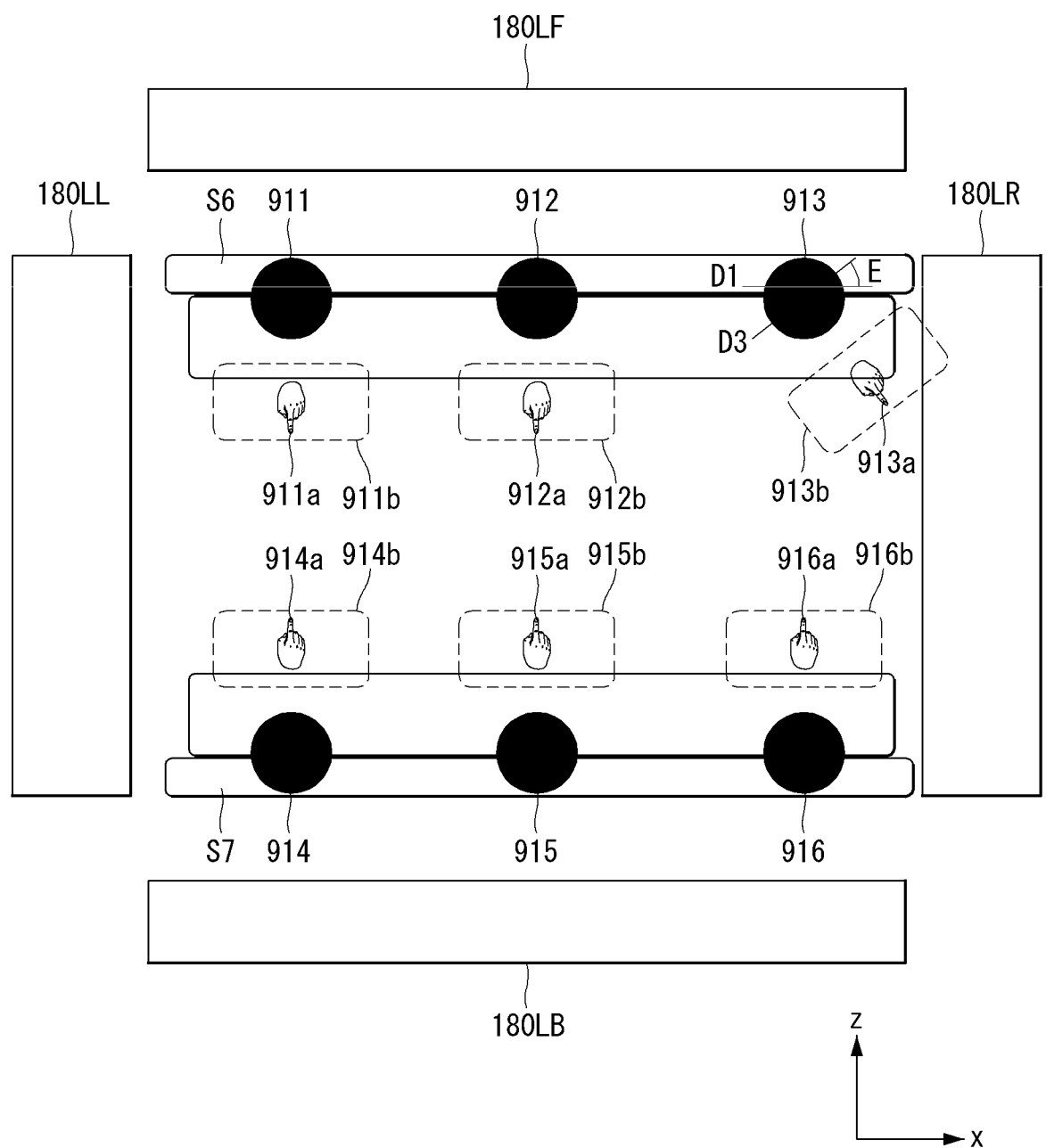
FIG. 18 is a view showing an embodiment in which a plurality of passengers control displays inside the vehicle.

FIG. 18 is a view showing an embodiment in which a plurality of passengers control displays inside the vehicle 700.

Referring to FIG. 18, the vehicle 700 may include a forward-facing seat S7 and a backward-facing seat S6. The vehicle 700 may be driving autonomously. When the vehicle 700 is driving autonomously, there may be no driver in the vehicle 700. Passengers 911, 912, and 913 may sit facing backward, and passengers 914, 915, and 916 may sit facing forward. The inside of the vehicle 700 may be surrounded by displays 180LF, 180LB, 180LL, and 180LR.

The passengers 914, 915, and 916 sitting facing forward may correspond to the front display 180LF. The processor 470 may form virtual control spaces 914b, 915b, and 916b in front of the passengers 914, 915, and 916 sitting facing forward, respectively for the passengers 914, 915, and 916. The passengers 914, 915, and 916 sitting facing forward may control the areas the respective passengers 914, 915, and 916 are facing on the front display 180LF by gestures 914a, 915a, and 916a. Alternatively, the processor 470 may match the areas on the front display 180LF the respective passengers 914, 915, and 916 are facing to the virtual control spaces 914b, 915b, and 916b of the respective passengers 914, 915, and 916, and, upon detecting the gestures 914a, 915a, and 916a from the virtual control spaces 914b, 915b, and 916b of the respective passengers 914, 915, and 916, the processor 470 may control the areas on the front display 180LF the respective passengers 914, 915, and 916 are facing, based on the gestures 914a, 915a, and 916a.

The passengers 911 and 912 sitting facing backward may correspond to the back display 180LB. The processor 470 may form virtual control spaces 911b and 912b in front of the passengers 911 and 912 sitting facing backward, respectively for the passengers 911 and 912. The passengers 911 and 912 sitting facing backward may control the areas the respective passengers 911 and 912 are facing on the back display 180LB by gestures 911a and 912a. Alternatively, the processor 470 may match the areas on the back display 180LB the respective passengers 911 and 912 are facing to the virtual control spaces 911b and 912b of the respective passengers 911 and 912, and, upon detecting the gestures 911a and 912a from the virtual control spaces 911b and 912b of the respective passengers 911 and 912, the processor 470 may control the areas on the back display 180LB the respective passengers 911 and 912 are facing, based on the gestures 911a and 912a.

The passenger 913 may twist the upper body at an angle toward a reference line D3 from a reference line D1. Alternatively, the passenger 913 may twist the upper body at an angle E from the reference line D1. The processor 470 may form a virtual control space 913b with respect to the passenger 913 twisting the upper body, and match the virtual control space 913b and the right display 180LR. The processor 470 may control the right display 180LR based on a gesture 913a from the passenger 913 detected through the virtual control space 913b.

Figure 19:
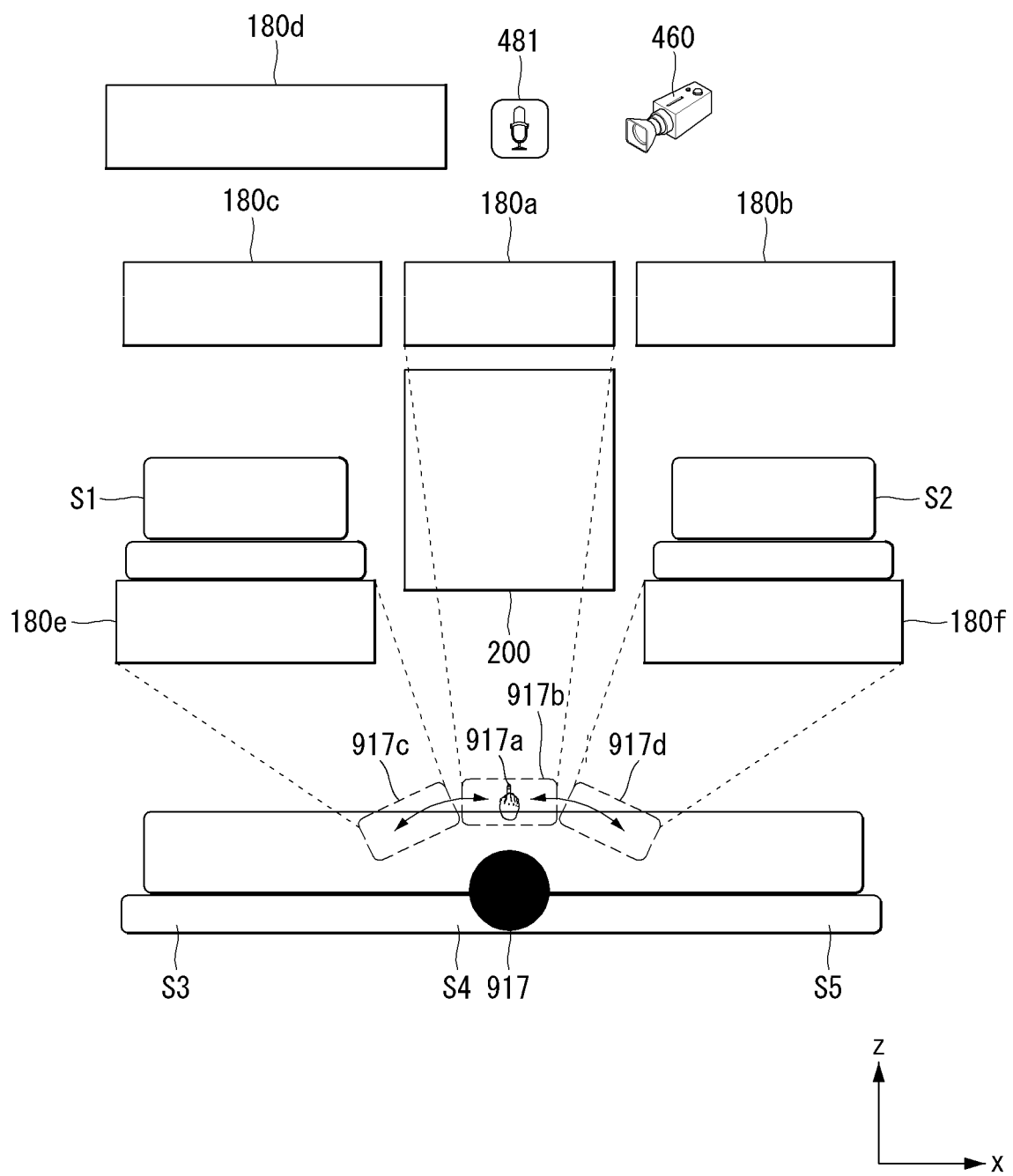
FIGS. 19 and 20 are views showing an embodiment in which a device inside the vehicle is controlled based on the movement of a passenger.
Figure 20:
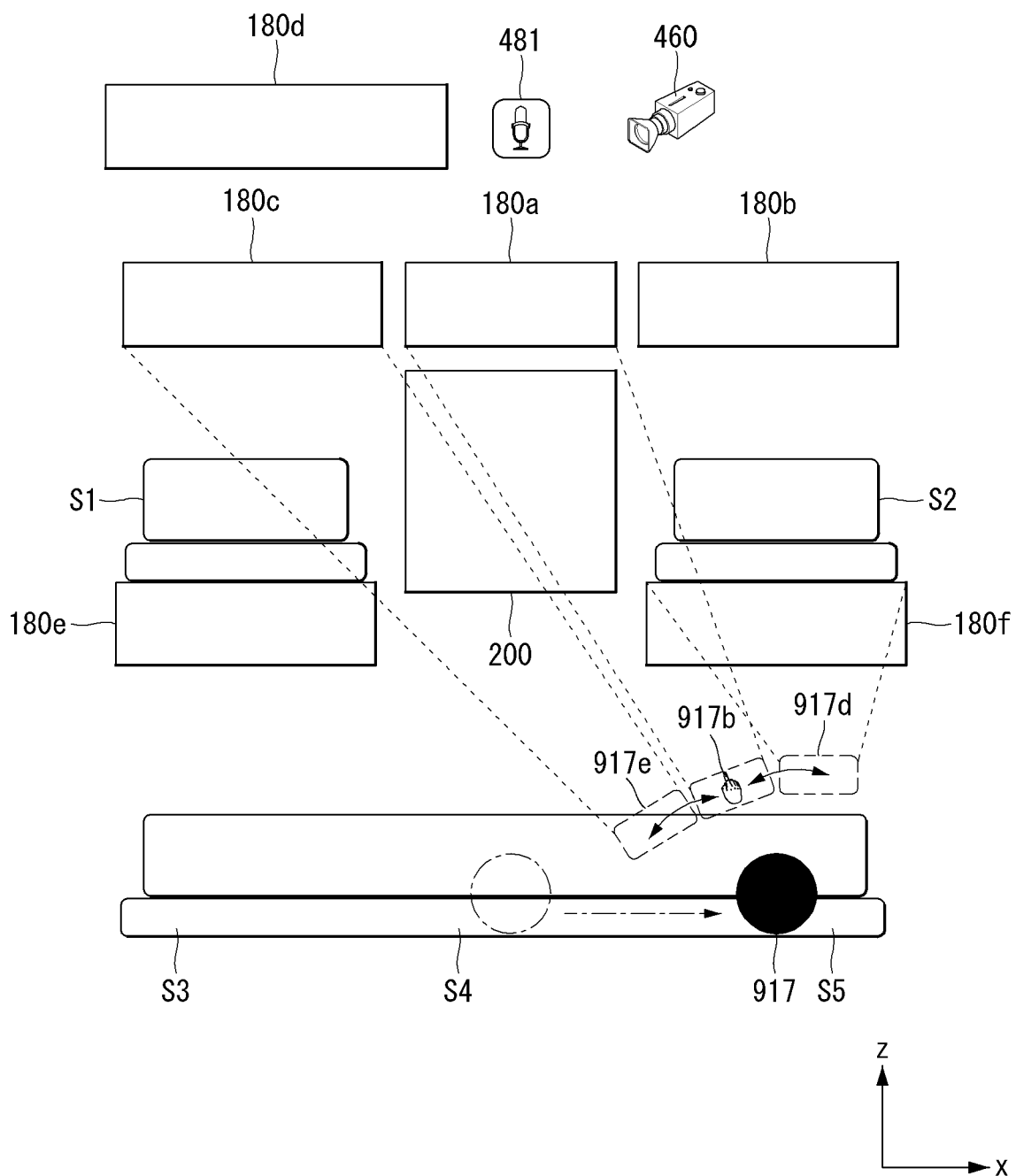

FIGS. 19 and 20 are views showing an embodiment in which a device inside the vehicle 700 is controlled based on the movement of a passenger 917.

Referring to FIG. 19, the processor 470 may detect the passenger's field of view through the camera 460. The processor 470 may match a plurality of devices positioned in the passenger's field of view with the passenger, and form different virtual control spaces for the plurality of devices corresponding to the passenger.

The processor 470 may form a plurality of virtual control spaces. The plurality of virtual control spaces may be disposed in such a fashion as to surround the passenger. The plurality of virtual control spaces may be formed between the devices and the passenger. The plurality of virtual control spaces may not overlap. The plurality of virtual control spaces may be adjacent to one another.

The processor 470 may match the plurality of devices corresponding to the passenger and the plurality of virtual control spaces, respectively.

For example, the processor 470 may detect the passenger 917's field of view through the camera 460, and pick out the displays 180*a*, 180*e*, and 180*f* positioned in the passenger 917's field of view. The processor 470 may form a virtual control space 917*c* and match the virtual control space 917*c* to the display 180*e*. The processor 470 may form a virtual control space 917*b* and match the virtual control space 917*b* to the display 180*a*. The processor 470 may form a virtual control space 917*d* and match the virtual control space 917*d* to the display 180*f*.

The passenger may enter a gesture 917*a* while moving between the virtual control spaces 917*b*, 917*c*, and 917*d*. Upon detecting a gesture 917*a* from the passenger 917 through the virtual control spaces 917*b*, 917*c*, and 917*d*, the processor 470 may inform the passenger 917 that the displays 180*a*, 180*e*, and 180*f*, which are matched to the virtual control spaces 917*b*, 917*c*, and 917*d* where the gesture 917*a* is detected, will be selected or controlled. The processor 470 may inform the passenger 917 or give feedback to the passenger 917 that the displays 180*a*, 180*e*, and 180*f* will be selected or controlled, by emitting a sound through the audio output unit 485 or showing an image through the display 180.

Referring to FIG. 20, a passenger may move their position. The processor may detect a change in the passenger's position. The processor may detect a change in the passenger's field of view based on the change in the passenger's position. The processor may match a plurality of devices positioned in the passenger's changed field of view with the passenger and form different virtual control spaces for controlling the plurality of devices corresponding to the passenger. The plurality of virtual control spaces may be added or deleted depending on whether the passenger's position has been moved or not. Also, the plurality of virtual control spaces may be rearranged depending on whether the passenger's position has been moved or not.

For example, the passenger may move to a fifth position S5. The processor 470 may detect the passenger 917's field of view through the camera 460 and pick out the displays 180*a*, 180*e*, and 180*f* positioned in the passenger 917's field of view.

The processor 470 may detect the display 180*e* that has disappeared from the passenger 917's field of view and the display 180*e* that has been added into the passenger 917's field of view, due to the movement of the passenger 917. The processor 470 may delete the virtual control space 917*c* matched to the display 180*e* that has disappeared from the passenger 917's field of view. The processor 470 may match the display 180*e* added into the passenger 917's field of view with the passenger 917 and create an additional virtual control space 917*e* and match it to the added display 180*e*.

The plurality of virtual control spaces 917*b*, 917*d*, and 917*e* may be rearranged with respect to the position to which the passenger 917 has moved.

The passenger 917 may enter a gesture 917*a* while moving between the virtual control spaces 917*b*, 917*d*, and 917*e*. Upon detecting a gesture 917*a* from the passenger 917 through the virtual control spaces 917*b*, 917*d*, and 917*e*, the processor 470 may inform the passenger 917 that the displays 180*a*, 180*e*, and 180*f*, which are matched to the virtual control spaces 917*b*, 917*d*, and 917*e* where the gesture 917 is detected, will be selected or controlled. The processor 470 may inform the passenger 917 or give feedback to the passenger 917 that the displays 180*a*, 180*e*, and 180*f* will be selected or controlled, by emitting a sound through the audio output unit 485 or showing an image through the display 180.

An exemplary embodiment of the present invention provides a vehicle control device including: an interface unit that is connected to a camera for capturing a vehicle passenger and to a plurality of devices installed inside the vehicle; and a processor that receives an image captured by the camera through the interface unit and exchanges information with the plurality of devices through the interface unit, wherein the processor detects the position of the passenger from the image acquired by the camera, configures a space adjacent to the passenger as a virtual control space, matches a device corresponding to the position of the passenger, among the plurality of devices, to the virtual control device, and, upon detecting a preset gesture through the virtual control space, controls the device based on the preset gesture.

The passenger may be positioned in a driver's seat, and a plurality of devices corresponding to the position of the passenger may be provided in front of the passenger, wherein the interface unit may be connected to a voice recognition unit installed inside the vehicle, and the processor may receive the passenger's voice recognized by the voice recognition unit through the interface unit, select one device corresponding to the position of the passenger from among the plurality of devices based on the passenger's voice, and match the selected device to the virtual control space.

The interface unit may be connected to a button provided inside the vehicle, and the processor may activate the voice recognition unit upon receiving an input into the button through the interface unit.

If the preset gesture is not detected from the virtual control space for a preset period of time after controlling the device based on the preset gesture, the processor may undo the matching of the selected device and the virtual control space.

Upon detecting a preset gesture through the virtual control space and detecting that the passenger's body is partially outside the virtual control space, the processor may control the device to correspond to the detected gesture and undo the matching of the selected device and the virtual control space.

The vehicle may include an assistant driver's seat spaced apart from the driver's seat, and the virtual control space may be positioned between the driver's seat and the assistant driver's seat.

The passenger may include a first passenger and a second passenger, and, if a device corresponding to the position of the first passenger and a device corresponding to the position of the second passenger are the same, and the first passenger is matched with the device earlier than the second passenger, the processor may give priority to the first passenger's gesture and control the device according to the priority.

The processor may configure the virtual control space in front of the first passenger.

The interface unit may be connected to a voice recognition unit that is installed inside the vehicle and detects the direction of a voice, and the processor may acquire the first passenger's voice and the first passenger's utterance position, sense the second passenger's voice based on the first passenger's utterance position, and perform noise cancelling on the second passenger's voice.

The device may be positioned in front of the passenger, and the virtual control space may be provided at a predetermined distance in front of the passenger and include a width corresponding to the shoulder width of the passenger.

The device may be positioned in front the passenger, the interface may be connected to a voice recognition unit installed inside the vehicle, and the processor may acquire the passenger's voice detected by the voice recognition unit through the interface unit and control the device based on the passenger's voice.

The device may be a first device, the virtual control space may be a first virtual control space, and the processor may detect a twist of the passenger's upper body from the image acquired by the camera, configure a space in front of the passenger as a second virtual control space based on the passenger twisting the upper body, match a second device corresponding to the passenger twisting the upper body, among the plurality of devices, to the second virtual control space, and, upon detecting a preset gesture from the second virtual control space, control the device based on the preset gesture.

The adjacent space may be at least one of a space positioned between the passenger and the device, a space positioned in front of the passenger, and a space positioned to one side of the passenger.

The processor may detect the passenger's field of view through the camera, pick out a plurality of devices positioned in the field of view, form a plurality of virtual control spaces respectively corresponding to the plurality of picked-out devices, match the plurality of picked-out devices and the plurality of virtual control devices, respectively, and, upon detecting the preset gesture through the plurality of virtual control spaces, control the device matched to the virtual control space where the preset gesture is detected.

The plurality of virtual control spaces may be spaced apart from one another, be positioned between the passenger and the plurality of picked-out devices, and surround the passenger.

Another exemplary embodiment of the present invention provides a vehicle control method including: detecting the position of a passenger from an image acquired by a camera for capturing a vehicle passenger; configuring a space adjacent to the passenger as a virtual control space; matching a device corresponding to the position of the passenger, among the plurality of devices, to the virtual control device, and; upon detecting a preset gesture through the virtual control space, controlling the device based on the preset gesture.

The passenger may be positioned in a driver's seat, and a plurality of devices corresponding to the position of the passenger may be provided, wherein the vehicle control method further includes: receiving the passenger's voice recognized by a voice recognition unit installed inside the vehicle; selecting one device corresponding to the position of the passenger from among the plurality of devices based on the passenger's voice; and matching the selected device to the virtual control space.

The vehicle control method may further include, upon receiving an input into a button provided inside the vehicle, activating the voice recognition unit.

The vehicle control method may further include, if the preset gesture is not detected from the virtual control space for a preset period of time after controlling the device based on the preset gesture, undoing the matching of the selected device and the virtual control space.

The vehicle control method may further include, upon detecting a preset gesture through the virtual control space and detecting that the passenger's body is partially outside the virtual control space, controlling the device to correspond to the detected gesture and undoing the matching of the selected device and the virtual control space.

The vehicle control method may further include, if the passenger includes a first passenger and a second passenger, a device corresponding to the position of the first passenger and a device corresponding to the position of the second passenger are the same, and the first passenger is matched with the device earlier than the second passenger, giving priority to the first passenger's gesture and controlling the device according to the priority.

The vehicle control method may further include: acquiring the first passenger's voice and the direction of the voice by a voice recognition unit installed inside the vehicle to detect the direction of voice; and performing noise cancelling on the second passenger's voice based on the direction of the voice.

The device may be a first device, the virtual control space may be a first virtual control space, and the vehicle control method may further include: detecting a twist of the passenger's upper body from the image acquired by the camera; configuring a space in front of the passenger as a second virtual control space based on the passenger twisting the upper body; matching a second device corresponding to the passenger twisting the upper body, among the plurality of devices, to the second virtual control space; and, upon detecting a preset gesture from the second virtual control space, controlling the device based on the preset gesture.

According to at least one exemplary embodiment of the present invention, it is possible to provide a vehicle control device that forms a virtual control space to allow a driver to control a device inside a vehicle by gesture while keeping their eyes ahead.

According to at least one exemplary embodiment of the present invention, it is possible to provide a vehicle control device that varies a target device based on a passenger twisting the upper body.

According to at least one exemplary embodiment of the present invention, it is possible to provide a vehicle control device that remotely controls a device inside a vehicle by detecting a passenger's gesture.

The vehicle control device according to the foregoing exemplary embodiment may enhance passengers' convenience. The vehicle control device according to the foregoing exemplary embodiment may be used during autonomous driving or semi-autonomous driving of a vehicle.

The features, structures, and effects described in the above embodiments are included in at least one embodiment of the present invention, and are not necessarily limited to only one embodiment. Moreover, the features, structures, and effects described in the embodiments may also be combined or modified to be carried out in other embodiments by those skilled in the art to which the embodiments pertain. Thus, the contents related to the combination and modification shall be construed to be included in the scope of the present invention.

Further, although the embodiments have been mainly described until now, they are just exemplary and do not limit the present invention. Thus, those skilled in the art to which the present invention pertains will know that various modifications and applications which have not been exemplified may be carried out within a range which does not deviate from the essential characteristics of the embodiments. For example, the constituent elements described in detail in the exemplary embodiments can be modified to be carried out. Further, the differences related to such modifications and applications shall be construed to be included in the scope of the present invention specified in the attached claims.

The invention claimed is:

1. A vehicle control device comprising:
an interface unit that is configured to be connected to a camera for capturing a passenger of a vehicle and to a plurality of devices installed inside the vehicle; and
a processor that configured to receive an image captured by the camera through the interface unit and to exchange information with the plurality of devices through the interface unit,
wherein the processor is configured to detect a position of the passenger from the image acquired by the camera, define a space adjacent to the passenger as a virtual control space, match a device corresponding to the position of the passenger, among the plurality of devices, to the virtual control space, and, upon detecting a preset gesture through the virtual control space, control the device based on the preset gesture, and
wherein the plurality of devices include a first device and a second device, and the virtual control space includes a first virtual control space, and
wherein the processor is configured to:
detect a twist of an upper body of the passenger from the image acquired by the camera,
define a space in front of the passenger as a second virtual control space based on the passenger twisting the upper body,
match the second device corresponding to the passenger twisting the upper body to the second virtual control space, and
based on detecting a preset gesture from the second virtual control space, control the second device based on the preset gesture.

2. The vehicle control device of claim 1, wherein the vehicle comprises a driver's seat configured to seat the passenger, and some of the plurality of devices correspond to the position of the passenger and are provided in front of the passenger, and
wherein the interface unit is configured to be connected to a voice recognition unit configured to be installed inside the vehicle, and the processor is configured to receive the passenger's voice recognized by the voice recognition unit through the interface unit, select one device corresponding to the position of the passenger from among the plurality of devices based on the passenger's voice, and match the selected device to the virtual control space.

3. The vehicle control device of claim 2, wherein the interface unit is configured to be connected to a button provided inside the vehicle, and the processor is configured to activate the voice recognition unit upon receiving an input into the button through the interface unit.

4. The vehicle control device of claim 2, wherein the processor is configured to, based on the preset gesture not being detected from the virtual control space for a preset period of time after controlling the device based on the preset gesture, undo the matching of the selected device and the virtual control space.

5. The vehicle control device of claim 2, wherein the processor is configured to, based upon detecting a preset gesture through the virtual control space and detecting that the passenger's body is partially outside the virtual control space, control the device to correspond to the detected gesture and undo the matching of the selected device and the virtual control space.

6. The vehicle control device of claim 5, wherein the vehicle comprises an assistant driver's seat spaced apart from the driver's seat, and the virtual control space is positioned between the driver's seat and the assistant driver's seat.

7. The vehicle control device of claim 1, wherein the first device corresponds to a position of a first passenger, and the vehicle further includes a second device corresponding to a position of a second passenger, and
wherein the processor is configured to, based on the first device coinciding with the second device, and the first passenger being matched with the first device earlier than the second passenger being matched to the second device, give a priority to the first passenger's gesture and control the first device according to the priority.

8. The vehicle control device of claim 7, wherein the processor is configured to define the virtual control space in front of the first passenger.

9. The vehicle control device of claim 7, wherein the interface unit is configured to be connected to a voice recognition unit that is installed inside the vehicle and detects a direction of a voice, and
wherein the processor is configured to acquire the first passenger's voice and the first passenger's utterance position, sense the second passenger's voice based on the first passenger's utterance position, and perform noise cancelling on the second passenger's voice.

10. The vehicle control device of claim 1, wherein the device is configured to be positioned in front of the passenger, and the virtual control space is provided at a predetermined distance in front of the passenger and comprises a width corresponding to a shoulder width of the passenger.

11. The vehicle control device of claim 1, wherein the device is configured to be positioned in front the passenger, the interface unit is configured to be connected to a voice recognition unit installed inside the vehicle, and
wherein the processor is configured to acquire the passenger's voice detected by the voice recognition unit through the interface unit and controls the device based on the passenger's voice.

12. The vehicle control device of claim 1, wherein the processor is configured to detect the passenger's field of view through the camera, determine a group of devices from the plurality of devices positioned in the field of view, define a plurality of virtual control spaces respectively corresponding to the group of devices, match the group of devices and the plurality of virtual control spaces, respectively, and, based on detecting the preset gesture through the plurality of virtual control spaces, control the device matched to the virtual control space where the preset gesture is detected.

13. The vehicle control device of claim 12, wherein the plurality of virtual control spaces are spaced apart from one another, are positioned between the passenger and the group of devices and configured to surround the passenger.

14. The vehicle control device of claim 1, wherein the space adjacent to the passenger is at least one of a space positioned between the passenger and the device, a space positioned in front of the passenger, and a space positioned to one side of the passenger.

15. A vehicle control method comprising:
- detecting a position of a passenger of a vehicle from an image acquired by a camera for capturing the passenger;
- configuring a space adjacent to the passenger as a virtual control space;
- matching a device corresponding to the position of the passenger, among a plurality of devices, to the virtual control space; and
- upon detecting a preset gesture through the virtual control space, controlling the device based on the preset gesture,
- wherein the plurality of devices include a first device and a second device, and the virtual control space includes a first virtual control space, and
- wherein the method further comprises:
  - detecting a twist of an upper body of the passenger from the image acquired by the camera,
  - configuring a space in front of the passenger as a second virtual control space based on the passenger twisting the upper body,
  - matching the second device corresponding to the passenger twisting the upper body to the second virtual control space, and
  - upon detecting a preset gesture from the second virtual control space, controlling the second device based on the preset gesture.

16. The vehicle control method of claim 15, wherein the vehicle includes a driver's seat configured to seat the passenger, and some of the plurality of devices correspond to the position of the passenger, and
- wherein the vehicle control method further comprises:
  - receiving the passenger's voice recognized by a voice recognition unit configured to be installed inside the vehicle;
  - selecting one device corresponding to the position of the passenger from among the plurality of devices based on the passenger's voice; and
  - matching the selected device to the virtual control space.

17. The vehicle control method of claim 16, further comprising:
- based on detecting a preset gesture through the virtual control space and detecting that the passenger's body is partially outside the virtual control space, controlling the device to correspond to the detected gesture and undoing the matching of the selected device and the virtual control space.

18. The vehicle control method of claim 16, further comprising:
- based on receiving an input into a button provided inside the vehicle, activating the voice recognition unit.

19. The vehicle control method of claim 16, further comprising:
- based on the preset gesture not being detected from the virtual control space for a preset period of time after controlling the device based on the preset gesture, undoing the matching of the selected device and the virtual control space.

* * * * *